United States Patent
Zeller et al.

(10) Patent No.: US 9,749,393 B2
(45) Date of Patent: *Aug. 29, 2017

(54) SYSTEM FOR DOWNLOADING AND EXECUTING A VIRTUAL APPLICATION

(71) Applicant: Code Systems Corporation, Seattle, WA (US)

(72) Inventors: Mark Jeremy Zeller, Seattle, WA (US); Kenji C. Obata, Seattle, WA (US)

(73) Assignee: CODE SYSTEMS CORPORATION, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,444

(22) Filed: Jan. 29, 2015

(65) Prior Publication Data
US 2015/0149525 A1 May 28, 2015

Related U.S. Application Data

(63) Continuation of application No. 12/705,492, filed on Feb. 12, 2010, now Pat. No. 8,959,183, which is a
(Continued)

(51) Int. Cl.
*H04L 29/08* (2006.01)
*G06F 9/455* (2006.01)
*G06F 9/445* (2006.01)

(52) U.S. Cl.
CPC .......... *H04L 67/06* (2013.01); *G06F 9/44521* (2013.01); *G06F 9/45533* (2013.01);
(Continued)

(58) Field of Classification Search
None
See application file for complete search history.

(56) References Cited

U.S. PATENT DOCUMENTS 4,468,732 A 8/1984 Raver
5,437,031 A 7/1995 Kitami
(Continued)

OTHER PUBLICATIONS

Notice of Allowance, 17 pages, received in U.S. Appl. No. 12/879,956, dated Feb. 21, 2013.
(Continued)

*Primary Examiner* — Greg C Bengzon
(74) *Attorney, Agent, or Firm* — Davis Wright Tremaine LLP; Heather M. Colburn

(57) ABSTRACT

A virtual process manager for use with a client application. Both the process manager and the client application are installed on a client computing device. In response to a user command to execute a virtual application at least partially implemented by a virtualized application file stored on a remote computing device, the client application sends a high priority command to the process manager to execute the virtual application. Before receiving the user command, the client application sends a low priority command to the process manager to download at least a portion of the virtualized application file. In response to the high priority command, and without additional user input, the process manager downloads any portion of the file not downloaded in response to the low priority command, and executes the virtual application on the client computing device. The client application may comprise a conventional web browser or operating system shell process.

13 Claims, 9 Drawing Sheets

Related U.S. Application Data continuation-in-part of application No. 12/695,107, filed on Jan. 27, 2010, now Pat. No. 9,104,517.

(52) U.S. Cl.
CPC .......... *G06F 9/45558* (2013.01); *H04L 67/10* (2013.01); *G06F 8/61* (2013.01); *G06F 8/67* (2013.01); *G06F 9/44568* (2013.01); *G06F 9/44578* (2013.01); *G06F 2009/45595* (2013.01)

(56) References Cited

U.S. PATENT DOCUMENTS

| | | | |
|---|---|---|---|
| 5,495,610 A | 2/1996 | Shing et al. | |
| 5,774,713 A | 6/1998 | Yokota | |
| 5,860,068 A | 1/1999 | Cook | |
| 5,987,590 A | 11/1999 | Wing So | |
| 6,023,712 A | 2/2000 | Spear et al. | |
| 6,192,375 B1 | 2/2001 | Gross | |
| 6,263,363 B1 | 7/2001 | Rosenblatt et al. | |
| 6,345,212 B1 | 2/2002 | Nourse | |
| 6,366,947 B1* | 4/2002 | Kavner | G06F 17/30902 |
| | | | 707/E17.12 |
| 6,453,334 B1 | 9/2002 | Vinson et al. | |
| 6,493,733 B1 | 12/2002 | Pollack et al. | |
| 6,564,229 B1 | 5/2003 | Baweja et al. | |
| 6,675,216 B1 | 1/2004 | Quatrano et al. | |
| 6,704,808 B2 | 3/2004 | Kasamatsu et al. | |
| 6,757,893 B1 | 6/2004 | Haikin | |
| 7,028,295 B2 | 4/2006 | Li et al. | |
| 7,064,760 B2 | 6/2006 | Capin et al. | |
| 7,065,504 B2 | 6/2006 | Sakuma et al. | |
| 7,076,768 B2 | 7/2006 | Li et al. | |
| 7,089,259 B1 | 8/2006 | Kouznetsov et al. | |
| 7,096,253 B2 | 8/2006 | Vinson et al. | |
| 7,096,416 B1 | 8/2006 | Smith et al. | |
| 7,117,495 B2 | 10/2006 | Blaser et al. | |
| 7,130,073 B2 | 10/2006 | Kumar et al. | |
| 7,162,036 B2 | 1/2007 | Rowe | |
| 7,240,162 B2 | 7/2007 | De Vries | |
| 7,246,351 B2 | 7/2007 | Bloch et al. | |
| 7,272,613 B2 | 9/2007 | Sim et al. | |
| 7,337,298 B2 | 2/2008 | Kawachiya et al. | |
| 7,356,679 B1 | 4/2008 | Le et al. | |
| 7,360,097 B2 | 4/2008 | Rothstein | |
| 7,386,542 B2 | 6/2008 | Maybury et al. | |
| 7,386,546 B1 | 6/2008 | Santry et al. | |
| 7,437,371 B2 | 10/2008 | Rathakrishnan et al. | |
| 7,451,176 B2 | 11/2008 | Anders et al. | |
| 7,451,196 B1 | 11/2008 | de Vries et al. | |
| 7,499,991 B2 | 3/2009 | Johnson | |
| 7,519,959 B1 | 4/2009 | Dmitriev | |
| 7,523,116 B2 | 4/2009 | Yan | |
| 7,529,784 B2 | 5/2009 | Kavuri et al. | |
| 7,536,541 B2 | 5/2009 | Isaacson | |
| 7,577,751 B2 | 8/2009 | Vinson et al. | |
| 7,584,342 B1 | 9/2009 | Nordquist et al. | |
| 7,590,644 B2 | 9/2009 | Matsakis et al. | |
| 7,600,097 B1 | 10/2009 | Wright | |
| 7,607,127 B2 | 10/2009 | Romm et al. | |
| 7,623,673 B2 | 11/2009 | Mercier | |
| 7,634,477 B2 | 12/2009 | Hinshaw | |
| 7,634,772 B2 | 12/2009 | Parthasarathy et al. | |
| 7,664,367 B2 | 2/2010 | Suzuki | |
| 7,669,189 B1 | 2/2010 | Umamageswaran | |
| 7,689,825 B2 | 3/2010 | Iwamura | |
| 7,707,564 B2 | 4/2010 | Marvin et al. | |
| 7,743,407 B2 | 6/2010 | Sprigg et al. | |
| 7,752,442 B2 | 7/2010 | Della-Libera et al. | |
| 7,752,511 B2 | 7/2010 | Fulton et al. | |
| 7,761,503 B2 | 7/2010 | Dhawan et al. | |
| 7,797,748 B2 | 9/2010 | Zheng et al. | |
| 7,801,827 B2 | 9/2010 | Bishop et al. | |
| 7,831,047 B2 | 11/2010 | Rowe | |
| 7,836,299 B2 | 11/2010 | England et al. | |
| 7,840,961 B1 | 11/2010 | Weathersby | |
| 7,950,026 B1 | 5/2011 | Urbach | |
| 7,958,497 B1 | 6/2011 | Lindo et al. | |
| 7,970,789 B1 | 6/2011 | Blaser et al. | |
| 7,971,032 B2 | 6/2011 | Shattuck | |
| 8,010,667 B2 | 8/2011 | Zhang et al. | |
| 8,065,675 B2 | 11/2011 | Strauss et al. | |
| 8,069,443 B2 | 11/2011 | Ackerman et al. | |
| 8,073,926 B2 | 12/2011 | Traut et al. | |
| 8,180,884 B1 | 5/2012 | Hall | |
| 8,219,805 B1 | 7/2012 | Ie et al. | |
| 8,230,442 B2 | 7/2012 | Aho et al. | |
| 8,271,944 B2 | 9/2012 | Austin et al. | |
| 8,347,208 B2* | 1/2013 | Howell | G06F 17/2205 |
| | | | 715/234 |
| 8,356,266 B1 | 1/2013 | Ou et al. | |
| 8,375,140 B2 | 2/2013 | Tippin et al. | |
| 8,387,006 B1 | 2/2013 | Taylor | |
| 8,429,248 B1 | 4/2013 | Ketrenos et al. | |
| 8,434,093 B2 | 4/2013 | Larimore et al. | |
| 8,453,049 B1* | 5/2013 | Grieve | G06F 9/45529 |
| | | | 715/234 |
| 8,468,175 B2 | 6/2013 | Obata | |
| 8,489,513 B2 | 7/2013 | Bishop et al. | |
| 8,510,734 B2 | 8/2013 | Criddle et al. | |
| 8,626,806 B2 | 1/2014 | Larimore et al. | |
| 8,645,488 B2 | 2/2014 | Ivory et al. | |
| 8,677,345 B2 | 3/2014 | Choi et al. | |
| 8,719,898 B1 | 5/2014 | Barton et al. | |
| 8,745,601 B1 | 6/2014 | Carlson et al. | |
| 8,762,495 B2 | 6/2014 | Obata et al. | |
| 8,762,951 B1 | 6/2014 | Kosche et al. | |
| 8,763,009 B2 | 6/2014 | Degirmenci et al. | |
| 8,769,051 B2 | 7/2014 | Obata | |
| 8,776,038 B2 | 7/2014 | Larimore et al. | |
| 8,782,106 B2 | 7/2014 | Obata | |
| 8,806,325 B2* | 8/2014 | Decker | G06F 17/30902 |
| | | | 345/543 |
| 8,914,427 B2 | 12/2014 | Larimore et al. | |
| 8,954,958 B2 | 2/2015 | Murphey et al. | |
| 8,978,012 B1 | 3/2015 | Poole | |
| 8,990,289 B2* | 3/2015 | Mott | G06F 17/30905 |
| | | | 709/203 |
| 9,003,541 B1 | 4/2015 | Patidar | |
| 9,021,015 B2 | 4/2015 | Murphey et al. | |
| 9,098,706 B1 | 8/2015 | Kennedy | |
| 9,104,517 B2 | 8/2015 | Obata et al. | |
| 9,106,425 B2 | 8/2015 | Murphey et al. | |
| 9,158,845 B1* | 10/2015 | Reddy | G06F 17/30899 |
| 9,207,934 B2 | 12/2015 | Larimore et al. | |
| 9,208,004 B2 | 12/2015 | Degirmenci et al. | |
| 9,208,169 B2 | 12/2015 | Obata | |
| 9,209,976 B2 | 12/2015 | Murphey et al. | |
| 9,218,359 B2 | 12/2015 | Larimore et al. | |
| 9,229,748 B2 | 1/2016 | Larimore et al. | |
| 9,251,167 B2 | 2/2016 | Obata | |
| 9,268,542 B1 | 2/2016 | Mars et al. | |
| 2001/0016905 A1 | 8/2001 | Kasamatsu et al. | |
| 2002/0029283 A1 | 3/2002 | Beckett et al. | |
| 2002/0032754 A1 | 3/2002 | Logston et al. | |
| 2002/0066085 A1 | 5/2002 | Nowlin, Jr. et al. | |
| 2002/0099951 A1 | 7/2002 | O'Connor | |
| 2002/0112078 A1 | 8/2002 | Yach | |
| 2002/0129129 A1 | 9/2002 | Bloch et al. | |
| 2002/0133491 A1 | 9/2002 | Sim et al. | |
| 2002/0138441 A1 | 9/2002 | Lopatic | |
| 2002/0161578 A1 | 10/2002 | Saindon et al. | |
| 2002/0162015 A1 | 10/2002 | Tang | |
| 2002/0174193 A1 | 11/2002 | Mikhalchuk | |
| 2003/0005118 A1 | 1/2003 | Williams | |
| 2003/0031176 A1 | 2/2003 | Sim et al. | |
| 2003/0051169 A1 | 3/2003 | Sprigg et al. | |
| 2004/0003390 A1* | 1/2004 | Canter | G06F 8/61 |
| | | | 717/178 |
| 2004/0044645 A1* | 3/2004 | Palumbo | G06F 17/30899 |
| 2004/0083474 A1 | 4/2004 | McKinlay et al. | |
| 2004/0111671 A1* | 6/2004 | Lu | G06F 17/30899 |
| | | | 715/205 |

(56) References Cited

U.S. PATENT DOCUMENTS

| | | |
|---|---|---|
| 2004/0128342 A1 | 7/2004 | Maes et al. |
| 2004/0133444 A1 | 7/2004 | Defaix et al. |
| 2004/0139315 A1 | 7/2004 | Tokutani et al. |
| 2004/0237082 A1* | 11/2004 | Alcazar .................... G06F 8/61 717/174 |
| 2004/0255293 A1 | 12/2004 | Spotswood |
| 2005/0010932 A1 | 1/2005 | Kohno et al. |
| 2005/0132359 A1 | 6/2005 | McGuire et al. |
| 2005/0198628 A1 | 9/2005 | Graham et al. |
| 2005/0198647 A1 | 9/2005 | Hipp et al. |
| 2005/0235282 A1 | 10/2005 | Anderson |
| 2005/0262553 A1 | 11/2005 | Bialick et al. |
| 2005/0273772 A1 | 12/2005 | Matsakis et al. |
| 2005/0283673 A1 | 12/2005 | Ode |
| 2005/0289546 A1 | 12/2005 | Shpeisman et al. |
| 2006/0048136 A1 | 3/2006 | Vries et al. |
| 2006/0053380 A1 | 3/2006 | Spataro et al. |
| 2006/0074733 A1 | 4/2006 | Shukla et al. |
| 2006/0075064 A1 | 4/2006 | Keohane et al. |
| 2006/0085359 A1 | 4/2006 | Kim |
| 2006/0117325 A1 | 6/2006 | Wieland et al. |
| 2006/0123185 A1 | 6/2006 | de Vries et al. |
| 2006/0168294 A1 | 7/2006 | de Vries et al. |
| 2006/0218165 A1 | 9/2006 | Vries et al. |
| 2006/0222203 A1 | 10/2006 | Mercier |
| 2006/0230175 A1 | 10/2006 | de Vries et al. |
| 2006/0242626 A1 | 10/2006 | Pham et al. |
| 2006/0248442 A1 | 11/2006 | Rosenstein et al. |
| 2006/0253535 A1 | 11/2006 | Betros et al. |
| 2006/0256130 A1 | 11/2006 | Gonzalez |
| 2006/0259585 A1 | 11/2006 | Keohane et al. |
| 2007/0011672 A1 | 1/2007 | Bhide et al. |
| 2007/0016721 A1 | 1/2007 | Gay |
| 2007/0043943 A1 | 2/2007 | Peretti |
| 2007/0074191 A1 | 3/2007 | Geisinger |
| 2007/0078988 A1 | 4/2007 | Miloushev et al. |
| 2007/0083482 A1 | 4/2007 | Rathi et al. |
| 2007/0143672 A1* | 6/2007 | Lipton .............. G06F 17/30899 715/205 |
| 2007/0143704 A1 | 6/2007 | Laird-McConnell |
| 2007/0168953 A1 | 7/2007 | Diez et al. |
| 2007/0168965 A1 | 7/2007 | Zenz et al. |
| 2007/0174824 A1 | 7/2007 | Relyea et al. |
| 2007/0192329 A1 | 8/2007 | Croft et al. |
| 2007/0226798 A1 | 9/2007 | Sibert |
| 2007/0234277 A1 | 10/2007 | Lei et al. |
| 2007/0240155 A1 | 10/2007 | Shlomai |
| 2007/0245331 A1 | 10/2007 | Daynes et al. |
| 2007/0277102 A1 | 11/2007 | Kanzaki |
| 2007/0283324 A1 | 12/2007 | Geisinger |
| 2007/0294373 A1 | 12/2007 | Harrison |
| 2007/0294674 A1 | 12/2007 | Marilly et al. |
| 2008/0010389 A1 | 1/2008 | Iwata |
| 2008/0016397 A1 | 1/2008 | Pagan |
| 2008/0034268 A1 | 2/2008 | Dodd et al. |
| 2008/0034364 A1 | 2/2008 | Lam et al. |
| 2008/0092057 A1 | 4/2008 | Monson et al. |
| 2008/0126785 A1 | 5/2008 | Chong et al. |
| 2008/0154985 A1 | 6/2008 | Childs et al. |
| 2008/0155171 A1 | 6/2008 | Jeong |
| 2008/0163194 A1 | 7/2008 | Dias et al. |
| 2008/0181230 A1 | 7/2008 | Hitt et al. |
| 2008/0184135 A1 | 7/2008 | Washburn et al. |
| 2008/0184211 A1 | 7/2008 | Nickolls et al. |
| 2008/0201705 A1 | 8/2008 | Wookey |
| 2008/0215722 A1 | 9/2008 | Hogaboom et al. |
| 2008/0235680 A1 | 9/2008 | Strauss |
| 2008/0275938 A1 | 11/2008 | Yach |
| 2008/0281882 A1 | 11/2008 | Hachio et al. |
| 2008/0294877 A1 | 11/2008 | Haga et al. |
| 2008/0298219 A1 | 12/2008 | Yamagata et al. |
| 2008/0301672 A1 | 12/2008 | Rao et al. |
| 2009/0037287 A1 | 2/2009 | Baitalmal et al. |
| 2009/0055542 A1 | 2/2009 | Zhao et al. |
| 2009/0064086 A1 | 3/2009 | Faus et al. |
| 2009/0076898 A1 | 3/2009 | Wang et al. |
| 2009/0076966 A1 | 3/2009 | Bishop et al. |
| 2009/0077551 A1 | 3/2009 | Whiteley |
| 2009/0077645 A1 | 3/2009 | Kottahachchi |
| 2009/0110307 A1 | 4/2009 | Markowitz |
| 2009/0125907 A1 | 5/2009 | Wen et al. |
| 2009/0132811 A1 | 5/2009 | Koster et al. |
| 2009/0133013 A1 | 5/2009 | Criddle et al. |
| 2009/0158432 A1 | 6/2009 | Zheng et al. |
| 2009/0164570 A1* | 6/2009 | Paila ................ G06Q 30/0609 709/203 |
| 2009/0172664 A1 | 7/2009 | Mostafa |
| 2009/0193057 A1 | 7/2009 | Maes |
| 2009/0198358 A1 | 8/2009 | Logan et al. |
| 2009/0199175 A1 | 8/2009 | Keller et al. |
| 2009/0216811 A1 | 8/2009 | Manczak et al. |
| 2009/0235158 A1 | 9/2009 | Rosenstein et al. |
| 2009/0240663 A1 | 9/2009 | Plattner et al. |
| 2009/0248695 A1* | 10/2009 | Ozzie ................ H04L 67/2861 |
| 2009/0249071 A1 | 10/2009 | De Atley et al. |
| 2009/0249324 A1 | 10/2009 | Brar et al. |
| 2009/0300076 A1 | 12/2009 | Friedman et al. |
| 2009/0300151 A1 | 12/2009 | Friedman et al. |
| 2009/0307351 A1 | 12/2009 | Raja et al. |
| 2009/0307763 A1 | 12/2009 | Rawlins et al. |
| 2009/0313322 A1 | 12/2009 | Sheehan et al. |
| 2009/0328030 A1 | 12/2009 | Fries |
| 2010/0005291 A1 | 1/2010 | Hulten et al. |
| 2010/0023640 A1 | 1/2010 | Vinson et al. |
| 2010/0023726 A1 | 1/2010 | Aviles |
| 2010/0023934 A1 | 1/2010 | Sheehan et al. |
| 2010/0023974 A1 | 1/2010 | Shiragaki et al. |
| 2010/0037206 A1 | 2/2010 | Larimore et al. |
| 2010/0037216 A1 | 2/2010 | Carcerano et al. |
| 2010/0037235 A1 | 2/2010 | Larimore et al. |
| 2010/0064295 A1 | 3/2010 | Aho et al. |
| 2010/0077096 A1 | 3/2010 | Philip et al. |
| 2010/0082926 A1 | 4/2010 | Sahita et al. |
| 2010/0088448 A1 | 4/2010 | Min et al. |
| 2010/0106804 A1 | 4/2010 | He et al. |
| 2010/0107163 A1 | 4/2010 | Lee |
| 2010/0121973 A1 | 5/2010 | Lobacheva et al. |
| 2010/0131084 A1 | 5/2010 | Van Camp |
| 2010/0132009 A1 | 5/2010 | Khemani et al. |
| 2010/0138479 A1 | 6/2010 | Zhu |
| 2010/0146590 A1 | 6/2010 | Jung |
| 2010/0169790 A1 | 7/2010 | Vaughan et al. |
| 2010/0205604 A1 | 8/2010 | Brower et al. |
| 2010/0223598 A1 | 9/2010 | Levine et al. |
| 2010/0235831 A1 | 9/2010 | Dittmer |
| 2010/0241718 A1 | 9/2010 | Rasmussen et al. |
| 2010/0250782 A1 | 9/2010 | Pratt et al. |
| 2010/0281458 A1 | 11/2010 | Paladino et al. |
| 2010/0306849 A1 | 12/2010 | Zheng et al. |
| 2010/0318997 A1 | 12/2010 | Li et al. |
| 2010/0322523 A1 | 12/2010 | Mitsuhashi et al. |
| 2010/0333085 A1 | 12/2010 | Criddle et al. |
| 2011/0004840 A1 | 1/2011 | Feinberg et al. |
| 2011/0022947 A1* | 1/2011 | Rajkumar ......... G06F 17/30902 715/235 |
| 2011/0029641 A1* | 2/2011 | Fainberg ........... G06F 17/30902 709/219 |
| 2011/0078625 A1 | 3/2011 | Mumford et al. |
| 2011/0106908 A1 | 5/2011 | Risku et al. |
| 2011/0145428 A1 | 6/2011 | Wei et al. |
| 2011/0145592 A1 | 6/2011 | Greiner |
| 2011/0145726 A1 | 6/2011 | Wei et al. |
| 2011/0153437 A1 | 6/2011 | Archer et al. |
| 2011/0153975 A1 | 6/2011 | Accapadi et al. |
| 2011/0154213 A1* | 6/2011 | Wheatley .............. G06F 3/0481 715/738 |
| 2011/0173251 A1 | 7/2011 | Sandhu et al. |
| 2011/0173607 A1 | 7/2011 | Murphey et al. |
| 2011/0179411 A1 | 7/2011 | Lederer |
| 2011/0185013 A1 | 7/2011 | Obata et al. |
| 2011/0185043 A1 | 7/2011 | Zeller et al. |
| 2011/0191772 A1 | 8/2011 | Larimore et al. |
| 2011/0225584 A1 | 9/2011 | Andrade et al. |
| 2011/0225592 A1 | 9/2011 | Goldin |

(56) References Cited

U.S. PATENT DOCUMENTS

| | | |
|---|---|---|
| 2011/0246659 A1 | 10/2011 | Bouazizi |
| 2011/0265078 A1 | 10/2011 | Beatty et al. |
| 2011/0289513 A1 | 11/2011 | Degirmenci et al. |
| 2011/0302274 A1 | 12/2011 | Lee et al. |
| 2012/0005237 A1 | 1/2012 | Obata |
| 2012/0005244 A1 | 1/2012 | Obata et al. |
| 2012/0005246 A1 | 1/2012 | Obata |
| 2012/0005309 A1 | 1/2012 | Obata et al. |
| 2012/0005310 A1 | 1/2012 | Obata |
| 2012/0005334 A1 | 1/2012 | Raja et al. |
| 2012/0005674 A1 | 1/2012 | Larimore et al. |
| 2012/0054744 A1 | 3/2012 | Singh et al. |
| 2012/0096071 A1 | 4/2012 | Murphey et al. |
| 2012/0110337 A1 | 5/2012 | Murphey et al. |
| 2012/0125993 A1 | 5/2012 | Thiele et al. |
| 2012/0150986 A1 | 6/2012 | Piccinini et al. |
| 2012/0155358 A1 | 6/2012 | Hao et al. |
| 2012/0203807 A1 | 8/2012 | Larimore et al. |
| 2012/0203808 A1 | 8/2012 | Larimore et al. |
| 2013/0086386 A1 | 4/2013 | Murphey et al. |
| 2013/0104208 A1 | 4/2013 | Kumar et al. |
| 2013/0104219 A1 | 4/2013 | Kumar et al. |
| 2013/0117567 A1 | 5/2013 | Chang et al. |
| 2013/0132525 A1 | 5/2013 | Tippin |
| 2013/0139250 A1 | 5/2013 | Lo et al. |
| 2013/0191882 A1 | 7/2013 | Jolfaei |
| 2013/0247070 A1 | 9/2013 | Larimore et al. |
| 2013/0254848 A1 | 9/2013 | Ge |
| 2013/0271456 A1 | 10/2013 | Haswell et al. |
| 2013/0275886 A1 | 10/2013 | Haswell et al. |
| 2013/0283362 A1 | 10/2013 | Kress et al. |
| 2014/0298401 A1 | 10/2014 | Batson et al. |

OTHER PUBLICATIONS

Final Office Action, 11 pages, received in U.S. Appl. No. 12/879,956 , dated Nov. 23, 2012.
Non-Final Office Action, 19 pages, received in U.S. Appl. No. 12/906,904, dated Nov. 13, 2012.
Final Rejection, received in U.S. Appl. No. 12/906,904, dated Jul. 31, 2013.
Notice of Allowance, received in U.S. Appl. No. 12/906,904, dated Oct. 8, 2014.
Non-Final Office Action, 24 pages, received in U.S. Appl. No. 12/916,348, dated Oct. 24, 2012.
Final Office Action, 26 pages, received in U.S. Appl. No. 12/916,348, dated Jul. 11, 2013.
Notice of Allowance, received in U.S. Appl. No. 12/916,348, dated Nov. 13, 2013.
Non-Final Office Action, received in U.S. Appl. No. 12/916,348, dated Sep. 4, 2014.
Notice of Allowance, received in U.S. Appl. No. 12/916,348 , dated Mar. 23, 2015.
Non-Final Office Action, 24 pages, received in U.S. Appl. No. 13/088,265, dated Dec. 12, 2012.
Final Office Action, 33 pages, received in U.S. Appl. No. 13/088,265, dated Jul. 25, 2013.
Notice of Allowance, received in U.S. Appl. No. 13/088,265, dated Feb. 14, 2014.
Non-Final Office Action, 15 pages, received in U.S. Appl. No. 13/171,258, dated Jul. 13, 2012.
Final Office Action, 33 pages, received in U.S. Appl. No. 13/171,258, dated Jan. 11, 2013.
Non-Final Office Action, received in U.S. Appl. No. 13/171,258, dated Apr. 29, 2014.
Final Office Action, received in U.S. Appl. No. 13/171,258, dated Jan. 23, 2015.
Non-Final Office Action, received in U.S. Appl. No. 13/171,258, dated Apr. 8, 2016.
Non-Final Office Action, 10 pages, received in U.S. Appl. No. 13/449,049, dated Dec. 13, 2012.
Notice of Allowance, 9 pages, received in U.S. Appl. No. 13/449,049, dated Apr. 29, 2013.
Notice of Allowance, 15 pages, received in U.S. Appl. No. 13/449,049, dated Aug. 13, 2013.
Non-Final Office Action, 9 pages, received in U.S. Appl. No. 13/449,140, dated Dec. 7, 2012.
Final Office Action, 13 pages, received in U.S. Appl. No. 13/449,140, dated Jul. 22, 2013.
Non-Final Rejection, received in U.S. Appl. No. 13/449,140, dated Nov. 15, 2013.
Notice of Allowance, received in U.S. Appl. No. 13/449,140, dated Aug. 11, 2014.
Notice of Allowance, received in U.S. Appl. No. 13/449,140, dated Nov. 20, 2014.
Non-Final Office Action, received in U.S. Appl. No. 13/683,969, dated Feb. 28, 2014.
Non-Final Office Action, received in U.S. Appl. No. 13/683,969, dated Nov. 14, 2014.
Notice of Allowance, received in U.S. Appl. No. 13/683,969, dated Feb. 4, 2015.
Notice of Allowance, received in U.S. Appl. No. 13/683,969 , dated Apr. 2, 2015.
Notice of Allowance, received in U.S. Appl. No. 13/866,682, dated Jun. 25, 2014.
Notice of Allowance, received in U.S. Appl. No. 13/866,682, dated Oct. 28, 2014.
Notice of Allowance, received in U.S. Appl. No. 13/866,682, dated Feb. 17, 2015.
Notice of Allowance, received in U.S. Appl. No. 13/866,682, dated Jun. 5, 2015.
Non-Final Office Action, received in U.S. Appl. No. 13/918,067, dated Feb. 27, 2014.
Notice of Allowance, received in U.S. Appl. No. 13/918,067, dated Nov. 17, 2014.
Notice of Allowance, received in U.S. Appl. No. 13/918,067, dated Mar. 2, 2015.
Notice of Allowance, received in U.S. Appl. No. 13/918,067, dated Jun. 15, 2015.
Notice of Allowance, received in U.S. Appl. No. 14/245,707, dated Feb. 12, 2016.
Non-Final Office Action, received in U.S. Appl. No. 14/262,511, dated Apr. 27, 2015.
Non-Final Office Action, received in U.S. Appl. No. 14/297,468, dated Feb. 26, 2015.
Final Office Action, received in U.S. Appl. No. 14/297,468, dated Oct. 16, 2015.
Non-Final Office Action, received in U.S. Appl. No. 14/297,506, dated Nov. 6, 2014.
Non-Final Office Action, received in U.S. Appl. No. 14/452,382, dated Feb. 10, 2016.
Non-Final Office Action, received in U.S. Appl. No. 14/608,033, dated Jul. 14, 2015.
Non-Final Office Action, received in U.S. Appl. No. 14/789,813, dated Feb. 12, 2016, 2014.
Thapin, John, "Hive: Operating System Fault Containment for Shared-Memory Multiprocessors," Technical Report No. CSL-TR-97-712, Computer Systems laboratory, Departments of Electrical Engineering and Computer Science, Stanford University, 156 pages, Jul. 1997.
Hung, Eugene, "Using Behavior Templates to Design Remotely Executing Agents For Wireless Clients," 2004 4th Norkshop on Applications and Services in Wireless Networks (ASWN), (2004).
Susitaival, et al., "Analyizing the File Availability and Download Time in a P2P File Sharing System," IEEE, 2007, pp. 88-95.
Thinstall, "Application Virtualization: A Technical Overview of the Thinstall Application Virtualization Platform," Nov. 2006.
VMware, "Introduction to VMware ThinApp" (Published Jun. 27, 2008) retrieved from http://www.vmware.com/pdf/thinapp_intro.pdf on Sep. 27, 2015.
Zheng et al., "SODON: A High Availability Multi-Source Content Distribution Overlay," IEEE, 2004, pp. 87-92.
Information Disclosure Statement Transmittal filed herewith.
U.S. Appl. No. 13/171,258, filed Jun. 28, 2011.

(56) References Cited

OTHER PUBLICATIONS

U.S. Appl. No. 14/245,707, filed Apr. 4, 2014.
U.S. Appl. No. 14/297,468, filed Jun. 5, 2014.
U.S. Appl. No. 14/452,382, filed Aug. 5, 2014.
U.S. Appl. No. 14/608,033, filed Jan. 28, 2015.
U.S. Appl. No. 14/608,444, filed Jan. 29, 2015.
U.S. Appl. No. 14/609,895, filed Jan. 30, 2015.
U.S. Appl. No. 14/731,344, filed Jun. 4, 2015.
U.S. Appl. No. 14/789,813, filed Jul. 1, 2015.
U.S. Appl. No. 14/789,858, filed Jul. 1, 2015.
U.S. Appl. No. 14/857,684, filed Sep. 17, 2015.
U.S. Appl. No. 14/877,790, filed Oct. 7, 2015.
U.S. Appl. No. 14/877,793, filed Oct. 7, 2015.
U.S. Appl. No. 14/960,163, filed Dec. 4, 2015.
U.S. Appl. No. 15/081,703, filed Mar. 25, 2016.
Non-Final Office Action, 20 pages, received in U.S. Appl. No. 12/188,155, dated Dec. 19, 2011.
Final Office Action, 22 pages, received in U.S. Appl. No. 12/188,155, dated Aug. 31, 2012.
Non-Final Office Action, 22 pages, received in U.S. Appl. No. 12/188,155, dated Feb. 28, 2013.
Notice of Allowance, 11 pages, received in U.S. Appl. No. 12/188,155, dated Jun. 25, 2013.
Notice of Allowance, received in U.S. Appl. No. 12/188,155, dated Oct. 25, 2013.
Notice of Allowance, received in U.S. Appl. No. 12/188,155, dated Feb. 13, 2014.
Restriction Requirement, received in U.S. Appl. No. 12/188,161, dated Dec. 20, 2011.
Non-Final Office Action, 14 pages, received in U.S. Appl. No. 12/188,161, dated May 10, 2012.
Notice of Allowance, 13 pages, received in U.S. Appl. No. 12/188,161, dated Oct. 10, 2012.
Notice of Allowance, 12 pages, received in U.S. Appl. No. 12/188,161, dated Dec. 4, 2012.
Notice of Allowance, 13 pages, received in U.S. Appl. No. 12/188,161, dated Jan. 4, 2013.
Non-Final Office Action, 8 pages, received in U.S. Appl. No. 12/685,576, dated Nov. 2, 2012.
Non-Final Office Action, 8 pages, received in U.S. Appl. No. 12/685,576, dated Jun. 20, 2013.
Final Office Action, received in U.S. Appl. No. 12/685,576, dated Jan. 30, 2014.
Notice of Allowance, received in U.S. Appl. No. 12/685,576, dated Sep. 23, 2014.
Non-Final Office Action, 17 pages, received in U.S. Appl. No. 12/695,107, dated Dec. 8, 2011.
Final Office Action, 16 pages, received in U.S. Appl. No. 12/695,107, dated Oct. 30, 2012.
Notice of Allowance, received in U.S. Appl. No. 12/695,107, dated Sep. 17, 2014.
Notice of Allowance, 21 pages, received in U.S. Appl. No. 12/697,029, dated Aug. 17, 2012.
Notice of Allowance, 26 pages, received in U.S. Appl. No. 12/697,029, dated May 24, 2013.
Notice of Allowance, received in U.S. Appl. No. 12/697,029, dated Oct. 3, 2014.
Restriction Requirement, 5 pages, received in U.S. Appl. No. 12/705,492, dated Mar. 15, 2013.
Restriction Requirement, received in U.S. Appl. No. 12/705,492, dated Aug. 6, 2014.
Notice of Allowance, received in U.S. Appl. No. 12/705,492, dated Sep. 26, 2014.
Notice of Allowance, received in U.S. Appl. No. 12/705,492, dated Oct. 31, 2014.
Non-Final Office Action, 18 pages, received in U.S. Appl. No. 12/876,082, dated Oct. 22, 2012.
Notice of Allowance, 26 pages, received in U.S. Appl. No. 12/876,082, dated May 10, 2013.
Notice of Allowance, received in U.S. Appl. No. 12/876,082, dated Feb. 28, 2014.
Notice of Allowance, received in U.S. Appl. No. 12/876,082, dated Sep. 26, 2014.
Restriction Requirement, received in U.S. Appl. No. 12/876,085, dated Jan. 27, 2012.
Non-Final Office Action, 9 pages, received in U.S. Appl. No. 12/876,085, dated Mar. 8, 2012.
Final Office Action, 12 pages, received in U.S. Appl. No. 12/876,085, dated Nov. 14, 2012.
Non-Final Office Action, 13 pages, received in U.S. Appl. No. 12/876,085, dated Mar. 18, 2013.
Notice of Allowance, received in U.S. Appl. No. 12/876,085, dated Nov. 14, 2013.
Notice of Allowance, received in U.S. Appl. No. 12/876,085, dated Mar. 6, 2014.
Notice of Allowance, 25 pages, received in U.S. Appl. No. 12/877,918, dated Mar. 19, 2012.
Notice of Allowance, 31 pages, received in U.S. Appl. No. 12/877,918, dated Jun. 21, 2012.
Notice of Allowance, 22 pages, received in U.S. Appl. No. 12/877,918, dated Aug. 16, 2012.
Notice of Allowance, 24 pages, received in U.S. Appl. No. 12/877,918, dated Sep. 26, 2012.
Notice of Allowance, 35 pages, received in U.S. Appl. No. 12/877,918, dated Apr. 26, 2013.
Notice of Allowance, received in U.S. Appl. No. 12/877,918, dated Aug. 20, 2013.
Notice of Allowance, received in U.S. Appl. No. 12/877,918, dated Dec. 13, 2013.
Non Final Office Action, 22 pages, received in U.S. Appl. No. 12/879,947, dated Jul. 10, 2013.
Notice of Allowance, received in U.S. Appl. No. 12/879,947, dated Jan. 27, 2014.
Non-Final Office Action, 11 pages, received in U.S. Appl. No. 12/879,956, dated Jun. 6, 2012.
Chapin, John, "Hive: Operating System Fault Containment for Shared-Memory Multiprocessors," Technical Report No. CSL-TR-97-712, Computer Systems laboratory, Departments of Electrical Engineering and Computer Science, Stanford University, 156 pages, Jul. 1997.
Hung, Eugene, "Using Behavior Templates to Design Remotely Executing Agents for Wireless Clients," 2004 4th Workshop on Applications and Services in Wireless Networks (ASWN), (2004).
Notice of Allowance, received in U.S. Appl. No. 12/695,107, dated Jan. 5, 2015.
Notice of Allowance, received in U.S. Appl. No. 12/695,107, dated Mar. 19, 2015.
Notice of Allowance, received in U.S. Appl. No. 12/697,029, dated Jan. 30, 2015.
Notice of Allowance, received in U.S. Appl. No. 12/876,082, dated Feb. 20, 2015.
Notice of Allowance, received in U.S. Appl. No. 12/876,082, dated Jun. 17, 2015.
Notice of Allowance, dated Jun. 23, 2006, received in U.S. Appl. No. 14/877,793.
Non-Final Office Action, dated Jul. 28, 2016, received in U.S. Appl. No. 14/877,890.
Lodi, Giorgia, Middleware Services for Dynamic Clustering of Application Servers (University of Bologna, 2006), 99 pages.
Notice of Allowance, dated Sep. 12, 2016, received in U.S. Appl. No. 14/452,382.
Final Office Action, dated Sep. 15, 2016, received in U.S. Appl. No. 14/789,813.
Non-Final Office Action, dated Sep. 21, 2016, received in U.S. Appl. No. 13/171,258.
Non-Final Office Action, dated Dec. 15, 2016, received in U.S. Appl. No. 14/789,858.
Notice of Allowance, dated Dec. 21, 2016, received in U.S. Appl. No. 14/789,813.
Final Office Action, dated May 8, 2017, received in U.S. Appl. No. 14/877,790.

(56) References Cited

OTHER PUBLICATIONS

Final Office Action, dated Jul. 13, 2017, received in U.S. Appl. No. 14/789,858.

* cited by examiner

SYSTEM FOR DOWNLOADING AND EXECUTING A VIRTUAL APPLICATION

CROSS REFERENCE TO RELATED APPLICATION(S)

This application is a continuation of U.S. patent application Ser. No. 12/705,492, filed on Feb. 12, 2010, which is a continuation-in-part of U.S. patent application Ser. No. 12/695,107, filed on Jan. 27, 2010.

BACKGROUND OF THE INVENTION

Field of the Invention

The present invention is directed generally to a virtual process manager and more particularly, to a virtual process manager configured to download a virtualized application file from a remote server and execute the downloaded file.

Description of the Related Art

A virtual application is a virtual machine image preconfigured with all of the files, registry data, settings, components, runtimes, and other dependencies required for a specific application to execute immediately and without installation on a host computing device. The virtual application is partially isolated from other applications implemented on a host computing device and partially isolated from an underlying host operating system installed and executing on the host computing device. The virtual application is encapsulated from the host operating system by a virtual runtime environment, which includes a virtual operating system, that receives operations performed by the virtualized application and redirects them to one or more virtualized locations (e.g., a virtual filesystem, virtual registry, and the like).

Thus, the virtual application may be conceptualized as including two components: a virtualization runtime and a virtual application configuration. The virtualization runtime implements the virtual runtime environment, which implements various operating system application programming interfaces ("APIs") in such a way that allows the executing virtual application to access and interact with items that may not be present on the host computer. The virtual application configuration includes data necessary to implement the virtual application within the virtualization runtime.

The virtual application is stored in and implemented by one or more data files and/or executable files. Depending upon the implementation details, the one or more data files and/or executable files storing and implementing the virtual application may include blocks of data corresponding to each application file of a natively installed version of the application. Herein, these blocks of data will be referred to as "virtual application files." The one or more data files and/or executable files storing and implementing the virtual application also include configuration information. When the virtual application is executed, the configuration information is used to configure the virtual operating system to execute the virtual application. For example, the configuration information may contain information related to the virtual application files, virtual registry entries, environment variables, services, and the like. The virtual operating system is configured to communicate with the host operating system as required to execute the virtual application on the host computing device.

A download manager is a computer program that downloads files from a web server over the Internet. The download manager is separate from a web browser, which is used to navigate to a web page displaying a link to a file stored on the server. When the user clicks on the link to the file, the download manager is launched and manages the download.

Conventional download managers require user interaction and an application installation process. For example, download managers typically require a user to select a storage location on the user's computer into which the file will be downloaded. Then, after the file is downloaded, the download manager typically launches the installation process or the user executes the file separately. Alternatively, a dialog box may ask the user if the user wants to install an application implemented by the downloaded file and/or execute the file. Often, when the user indicates the user wants to execute the application, an installer is launched that installs the application. The installation process often requires additional user interactions, and may be very time consuming, require special permissions to perform the installation, and perform potentially undesirable modifications to the user's computing device. When the installer is finished, the installer may execute the downloaded (and installed) file. However, the user is typically queried a second time as to whether the user would like to execute the file.

Thus, prior art download managers require user interaction after a file is selected for download. Therefore, using conventional download managers is time consuming and requires substantial user interaction. Further, because the user must respond to the questions presented by the download manager, the user must monitor at least a portion of the file transfer.

A need exists for a virtual process manager configured to download and execute a virtual application while requiring less user interaction than prior art download managers. A further need exists for a virtual process manager that more quickly executes virtualized application files stored on a remote server particularly in view of the fact that a virtualized application file need not be installed on the user's computer to execute thereon. A method of launching applications stored on a remote server is also desirable. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

The present application describes a virtual process manager (referred to as a "Sandbox Manager") configured to download a virtualized application file from a server computing device to a client computing device operated by a user. The Sandbox Manager does not query the user for any information during the download or execution of the virtualized application file. The user simply selects the virtualized application file for download using a Client Application (such as a web browser or operating system shell) and together the Client Application and the Sandbox Manager effect the transfer of the virtualized application file to the client computing device and the execution of the virtualized application file on the client computing device. Thus, the user need not select a location in which to store the virtualized application file on the client computing device or indicate whether the user would like to execute the virtualized application file. In this manner, the Sandbox Manager may be used to download and execute the virtualized application file in less time than is required using a conventional download manager.

Figure 1:
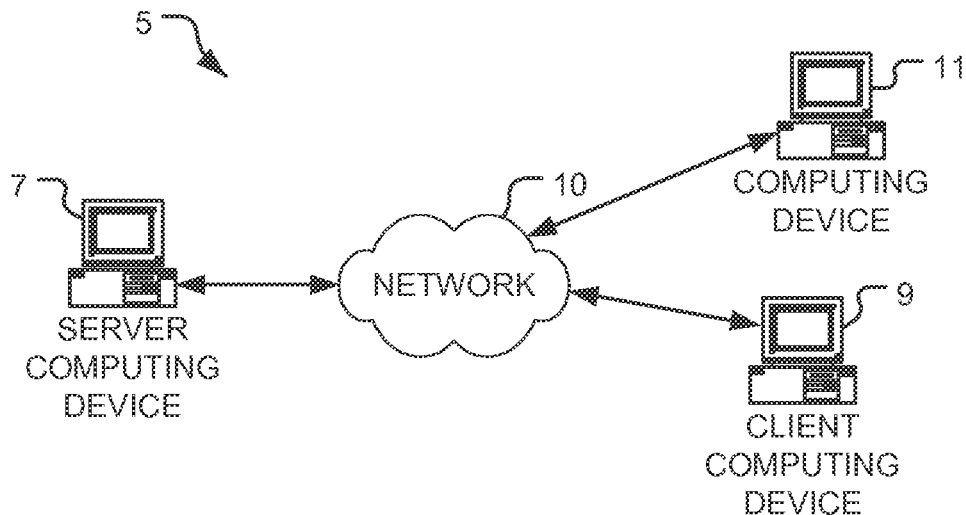
FIG. 1 is a diagram of a system for transferring a virtualized application file from a server computing device to a client computing device over a network.

FIG. 1 illustrates a system 5 for downloading or otherwise transferring a virtualized application file stored on a server computing device 7 to a client computing device 9 over a network 10 (e.g., the Internet, a WAN, a LAN, a combination thereof, and the like). One or more additional computing devices, such as the computing device 11 may also be coupled to the network 10. In the embodiment illustrated, the server computing device 7 is implemented as a web server. A diagram of hardware and an operating environment in conjunction with which implementations of the server computing device 7, the client computing device 9, the network 10, and the computing device 11 may be practiced is provided in FIG. 8 and described below.

Figure 2:
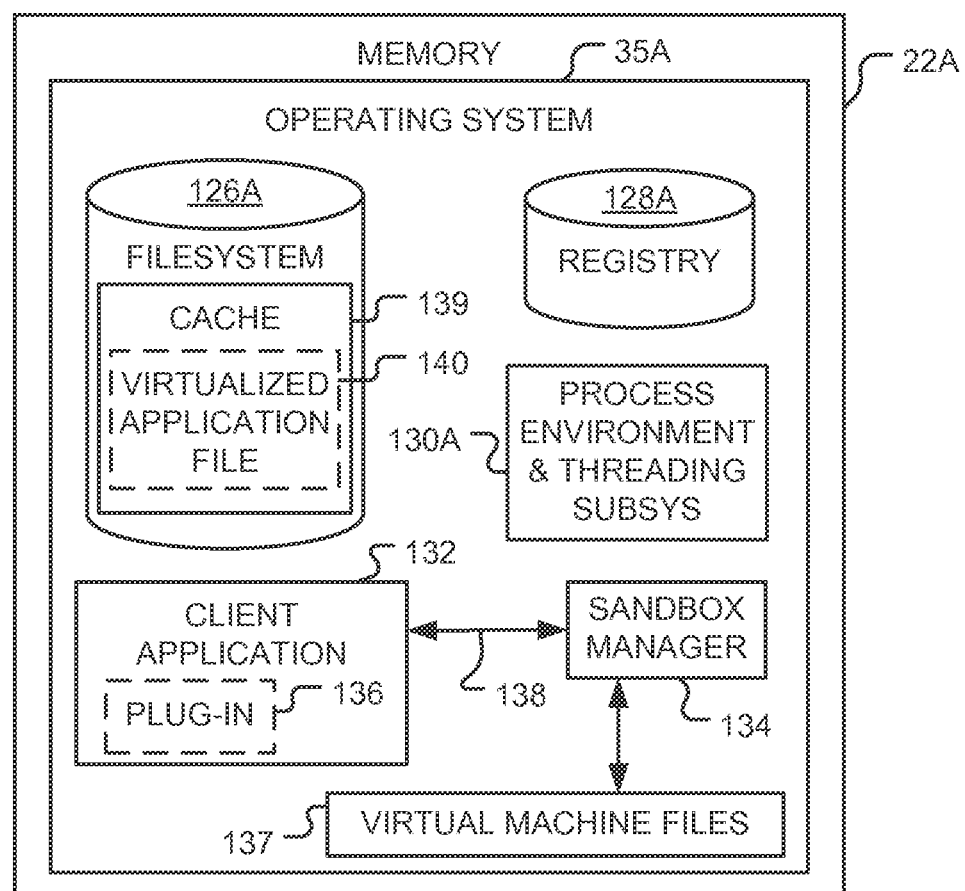
FIG. 2 is an illustration of a conceptualization of software components stored in a system memory of the client computing device of FIG. 1, the software components including a Client Application and a Sandbox Manager.

FIG. 2 illustrates a system memory 22A of the client computing device 9 (illustrated in FIG. 1) storing a conventional operating system 35A, that like most operating systems, includes a filesystem 126A, a registry 128A, and a process environment and threading subsystems component 130A. A Client Application 132 (e.g., a web browser application) and a Sandbox Manager 134 are also stored in the system memory 22A of the client computing device 9 (illustrated in FIG. 1). Optionally, as explained below, the Client Application 132 may include a plug-in 136 or similar application. In the embodiment illustrated, the Client Application 132 communicates with the Sandbox Manager 134 over a communication link 138 that may be implemented as a Transmission Control Protocol ("TCP") connection using TCP protocol. A cache 139 may be stored on the filesystem 126A for use by the Sandbox Manager 134.

As explained above, a virtualized application file 140 is transferred to the client computing device 9 from the server computing device 7. The virtualized application file 140 is illustrated in dashed lines to indicate that the virtualized application file 140 is stored in the cache 139 during and after the download. However, before the download begins, the virtualized application file 140 is not stored in the cache 139. As will be explained below, the virtualized application file 140 may be an executable file or a file configured to execute within a virtualized environment provided by a virtual machine.

The system memory 22A stores one or more files implementing one or more virtual machines. By way of a non-limiting example, the system memory 22A may include a plurality of virtual machine executable files 137 that when executed, each implement a different virtual machine. For example, each of the virtual machine executable files 137 may implement a different version of the same virtual machine. The virtual machine executable files 137 may be executed individually. When executed, a virtual machine executable file implements a virtualized environment. Execution of a virtual machine executable file may be initiated by the Sandbox Manager 134 using a command including a parameter (e.g., a file path) identifying a virtualized application file to execute. In response to receiving the parameter, the virtual machine executable file executes the identified virtualized application file inside the virtualized environment implemented by the virtual machine executable file. The virtual machine may execute within an operating system shell process. Optionally, the virtual machine executable files 137 may be stored in the cache 139.

The virtualized application file 140 includes a version identifier that may be used by the Sandbox Manager 134 to select which of the virtual machine executable files 137 is configured to execute the virtualized application file 140.

Figure 3:
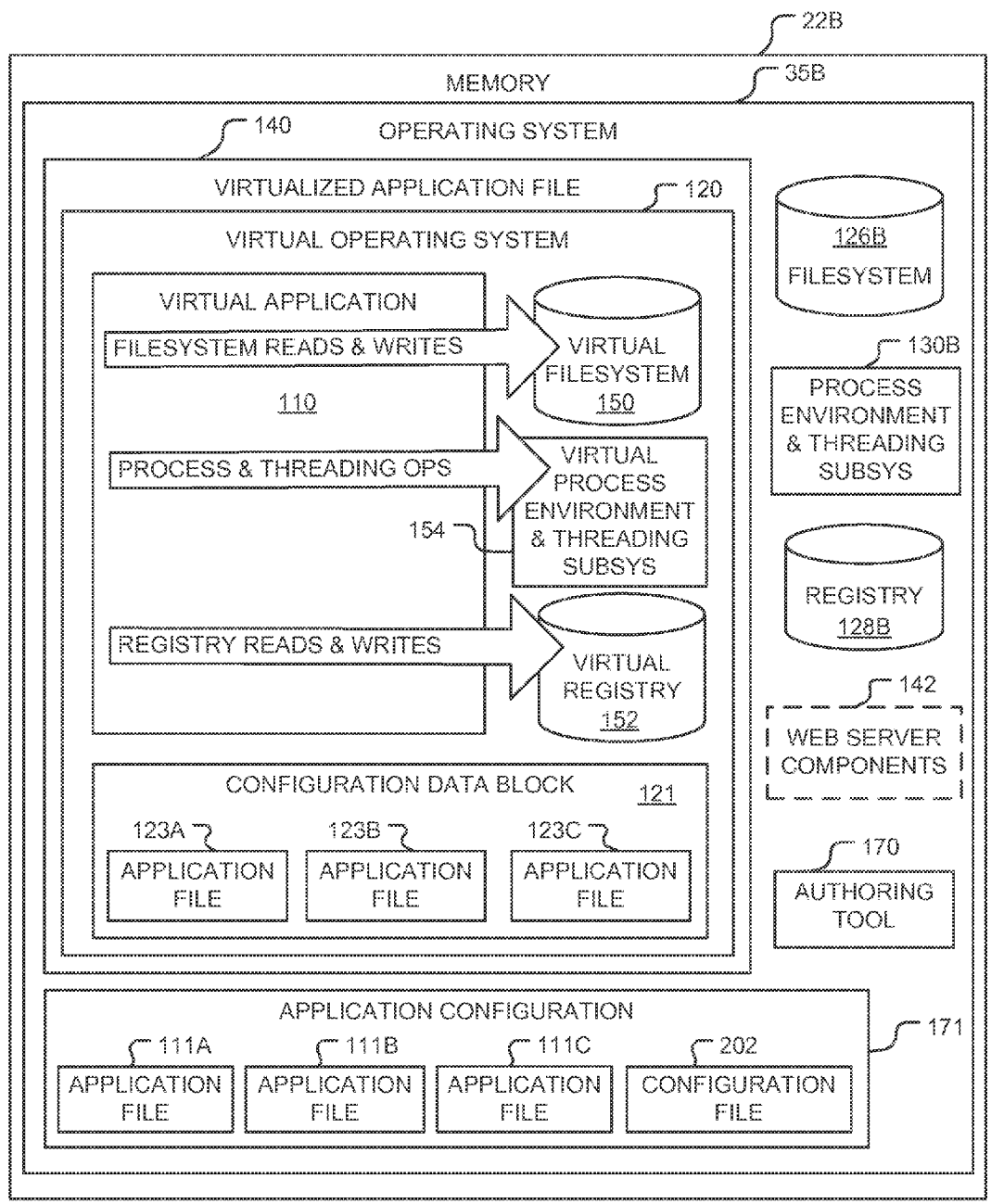
FIG. 3 is an illustration of a conceptualization of software components stored in a system memory of the server computing device of FIG. 1, the software components including a virtualized application file.

FIG. 3 illustrates a system memory 22B of the server computing device 7 (illustrated in FIG. 1). The system memory 22B stores a conventional operating system 35B, illustrated as including a filesystem 126B, a registry 128B, and a process environment and threading subsystems component 130B. The system memory 22B stores the virtualized application file 140, which is configured to execute on the operating system 35A (see FIG. 2) of the client computing device 9 (illustrated in FIG. 1), optionally within a virtual machine implemented by a separate virtual machine executable file, without having been installed on the operating system 35A of the client computing device 9. The virtualized application file 140 may be configured to execute on the operating system 35B of the server computing device 7 (illustrated in FIG. 1), optionally within a virtual machine implemented by a separate virtual machine executable file, but this is not a requirement.

In the embodiment illustrated, the system memory 22B stores web server components 142 configured to implement a web server. The web server components 142 may be configured to provide a web page having one or more links to virtualized application files using standard http protocol. By way of non-limiting examples, the web server components 142 may include Internet Information Services ("IIS") provided by Microsoft Corporation, Apache, and the like. While illustrated as being outside the filesystem 126B, those of ordinary skill in the art appreciate that the virtualized application file 140 and web server components 142 may be conceptualized as being within the filesystem 126B.

The virtualized application file 140 may include components necessary to implement a virtual runtime environment including a virtual operating system 120 configured to execute in the operating system 35A (see FIG. 2) of the client computing device 9 (illustrated in FIG. 1). Alternatively, the virtual runtime environment may be implemented by one of the virtual machine executable files 137 (see FIG. 2). The virtualized application file 140 includes components necessary to implement a virtual application 110 configured to execute in the virtual runtime environment. In particular embodiments, a single virtualized application file is used to implement both the virtual operating system 120 and the virtual application 110. However, those of ordinary skill in the art appreciate that more than one virtualized application file may be used to implement the virtual operating system 120 and the virtual application 110. For example, the components implementing the virtual runtime environment may be stored in one of the virtual machine executable files 137 (see FIG. 2) and the components implementing the virtual application 110 may be stored in the virtualized application file 140. Further, one or more of the files used to implement the virtual application 110 may be other than an executable file having the "exe" file extension.

U.S. patent application Ser. No. 12/697,029 filed on Jan. 29, 2010 describes a file format that may be used by the virtualized application file 140 and an xlayer file. U.S. patent application Ser. No. 12/697,029 is incorporated by reference herein in its entirety. The virtual application 110 may be implemented using the virtualized application file 140 and/or one or more xlayer files as described in U.S. patent application Ser. No. 12/697,029. The xlayer file cannot be executed directly from the operating system 35A and instead requires the virtual runtime environment supplied at least in part by the virtual operating system 120. The virtual operating system 120 may be supplied by one of the virtual machine executable files 137. Thus, the xlayer file may be executed by one of the virtual machine executable files 137.

The virtual operating system 120 includes a virtual filesystem 150, a virtual registry 152, and a virtual process environment and threading subsystems component 154. When executing, the virtual application 110 interacts with the virtual filesystem 150, virtual registry 152, and virtual process environment and threading subsystems component 154, instead of interacting directly with the filesystem 126A, the registry 128A, and the process environment and threading subsystems component 130A of the operating system 35A illustrated in FIG. 2. The virtual operating system 120 is configured to communicate with the operating system 35A illustrated in FIG. 2 as required to execute the virtual application 110.

The virtual application 110 executes inside a virtual runtime environment provided at least in part by the virtual operating system 120. Some virtual applications require one or more additional runtime environments to execute. For example, to execute a Flash application, the Flash runtime engine must also be installed. Therefore, to virtualize a Flash application, both the Flash application and Flash runtime engine must be included in the virtualized application file 140 and configured to execute in the portions of the virtual runtime environment provided by the virtual operating system 120. Collectively, all runtime components necessary to execute the virtual application 110 will be referred to as a virtual runtime engine. However, those of ordinary skill in the art appreciate that the virtual runtime engine may include only the virtual operating system 120 and components of other additional runtime engines (e.g., the Flash runtime engine) required to execute the virtual application 110 may be loaded separately by the virtual operating system 120. When executed, the virtual runtime engine generates, at least in part, the virtual runtime environment in which the virtual application 110 executes.

The virtualized application file 140 includes a configuration data block 121. The configuration data block 121 may include virtual application files 123A-123C corresponding to each of the application files of a natively installed version of the same application. The virtualized application file 140 identifies one or more of the virtual application files 123A-123C as a startup executable that executes when the virtual application 110 is first executed. The startup executable may be identified in the configuration data block 121.

When the virtualized application file 140 is executed, the configuration data block 121 configures the virtual operating system 120 to execute the virtual application 110. For example, the configuration data block 121 may contain configuration information related to files and directories in the virtual filesystem 150, keys and values in the virtual registry 152, environment variables, services, and the like.

The configuration data block 121 may also include basic application metadata and settings such as the application name, application version, and sandbox location. Further, the configuration data block 121 may provide isolation information to the virtual operating system 120. This information indicates which directories, virtual application files 123A-123C, virtual registry entries, environment variables, and services are to be isolated from the operating system 35A (see FIG. 2) of the client computing device 9 (see FIG. 1). While illustrated as being outside the virtual filesystem 150, those of ordinary skill in the art appreciate that the application files 123A-123C may be conceptualized as being within the virtual filesystem 150 when the virtual application 110 is executing.

To execute the virtual application 110, an initialization process is first performed. During this process, the virtual operation system 120 is launched and configured by the configuration data block 121. After the initialization process has completed, the appropriate startup executable(s) is/are launched inside the virtual operating system 120. The virtual operating system 120 intercepts calls to the operating system 35A and routes them to corresponding components of the virtual operating system 120. For example, when the virtual application 110 requests access an application file that corresponds to the virtual application file 123A using a path of a natively installed version of the application, the virtual operating system 120 intercepts the request and routes the request to one of the virtual application file 123A. The virtual operating system 120 may also route some requests and actions to the operating system 35A (see FIG. 2) of the client computing device 9 (see FIG. 1) for processing.

U.S. patent application Ser. No. 12/188,155, filed on Aug. 7, 2008, U.S. patent application Ser. No. 12/188,161 filed on Aug. 7, 2008, and U.S. patent application Ser. No. 12/685,576 filed on Jan. 11, 2010, all of which are incorporated herein by reference in their entireties, disclose systems that may be used to create and configure the virtualized application file 140. As described in greater detail in U.S. patent application Ser. Nos. 12/188,155, 12/188,161, and 12/685,576, the virtualized application file 140 may be created by a virtual application executable constructor or authoring tool 170 using an application template that includes copies of files, such as a configuration file 202, application files 111A-111C, and the like, used to configure the virtualized application file 140. However, the template is not a requirement. Instead, to build the virtualized application file 140, the authoring tool 170 needs only the configuration file 202 and copies of any applications files 111A-111C necessary for a natively installed version of the application to execute. The applications files 111A-111C, and the configuration file 202 are referred to collectively as an application configuration 171. In some embodiments, the authoring tool 170 combines the application configuration 171 and the components of the virtual runtime engine (e.g., the virtual operating system 120) into an executable virtualized application file. However, in other embodiments, the authoring tool 170 omits the components of the virtual runtime engine from the virtualized application file to create a virtualized application file for execution by a virtual machine implemented by a virtual machine executable file, such as one of the virtual machine executable files 137.

For ease of illustration, the authoring tool 170 and the application configuration 171 have been illustrated as being stored in the system memory 22B of the server computing device 7 (see FIG. 1). However, this is not a requirement. As is apparent to those of ordinary skill in the art, the virtualized application file 140 may be created on a computing device other than the server computing device 7, such as the computing device 11 illustrated in FIG. 1, and transferred to the server computing device 7 illustrated in FIG. 1 for storage thereon.

Returning to FIG. 2, as mentioned above, the system memory 22A of the client computing device 9 (see FIG. 1) stores the Client Application 132 and the Sandbox Manager 134.

Client Application

The Client Application 132 translates user commands (button clicks, etc) into requests for operations that the Sandbox Manager 134 performs. In embodiments in which the Client Application 132 is implemented as a web browser, the browser plug-in 136 or other type of translation application may be installed on the client computing device 9 (see FIG. 1). Together the browser and browser plug-in 136 perform the functions of the Client Application 132.

By way of a non-limiting example, the browser plug-in 136 may be installed on the client computing device 9 (see FIG. 1) by placing a dynamic link library ("dll") implementing the plug-in 136 in a predetermined installation directory and registering the dll (i.e., an assembly) in the registry 128A (e.g., a Windows registry) of the client computing device 9 (see FIG. 1). An Assembly Registration tool (e.g., Regasm.exe) may be used to register the dll in the registry 128A.

Once the plug-in 136 has been installed, the plug-in can be used by a website (implemented by the web server components 142 (see FIG. 3) of the server computing device 7 illustrated in FIG. 1) via client-scripting technologies, such as client-side javascript code executing in the Client Application 132. To access the plug-in 136 from the server computing device 7 illustrated in FIG. 1, a plug-in object reference is created and sent to the Client Application 132. In response to receiving the reference to the plug-in 136, the Client Application 132 loads the plug-in by mime-type, ProgID, class GUID, and the like depending on the implementation details of the Client Application 132 (which in this embodiment, is implemented as a web browser). The plug-in 136 exposes methods which can be used to send requests to the Sandbox Manager 134.

The requests include commands and optionally, one or more parameters. The requests may be implemented as strings, each including a command. If the request also includes parameters, the parameters may be separated from one another and the command by a predetermined character, such as a semi-colon, comma, and the like. In other words, the request may be implemented as a semi-colon delimitated string or a string delimited in another manner. The following Table A provides a list of commands that my be included in a request.

TABLE A

| Command | Parameters | Description of Command |
|---------|------------|------------------------|
| ping | None | Commands the Sandbox Manager 134 to return a predetermined value. For example, the ping command may command the Sandbox Manager to return a predetermined string (e.g., "TRUE") |
| start | an application identifier, priority value | Commands the Sandbox Manager 134 to start the transfer of the virtualized application file 140 identified by the application identifier to the client computing device. The priority value indicates whether the transfer is given a low priority or a high priority. |
| status | session identifier | Commands the Sandbox Manager 134 to provide current status of the transfer of the virtualized application file 140 identified by the session identifier |
| progress | session identifier | Commands the Sandbox Manager 134 to provide current progress of the transfer of the virtualized application file 140 identified by the session identifier. The progress may be indicated as percentage of the virtualized application file 140 transferred (e.g., 10%, 25%, and 100%). |
| exec | session identifier; and optionally, command-line arguments | Commands the Sandbox Manager 134 to execute the virtual application 110 implemented at least in part by the virtualized application file 140 identified by the session identifier that was transferred previously to the client computing device 9 illustrated in FIG. 1 |

As mentioned above, the Client Application 132 communicates with the Sandbox Manager 134 over the communication link 138, which may be implemented as a TCP connection. By way of a non-limiting example, the Client Application 132 may send the requests as text messages using TCP protocol to the Sandbox Manager 134 over the TCP connection. As described above, each of the requests includes a command and may include one or more parameters (e.g., a parameter list). These commands may be characterized as a communication protocol between the Client Application 132 and the Sandbox Manager 134.

Figure 4:
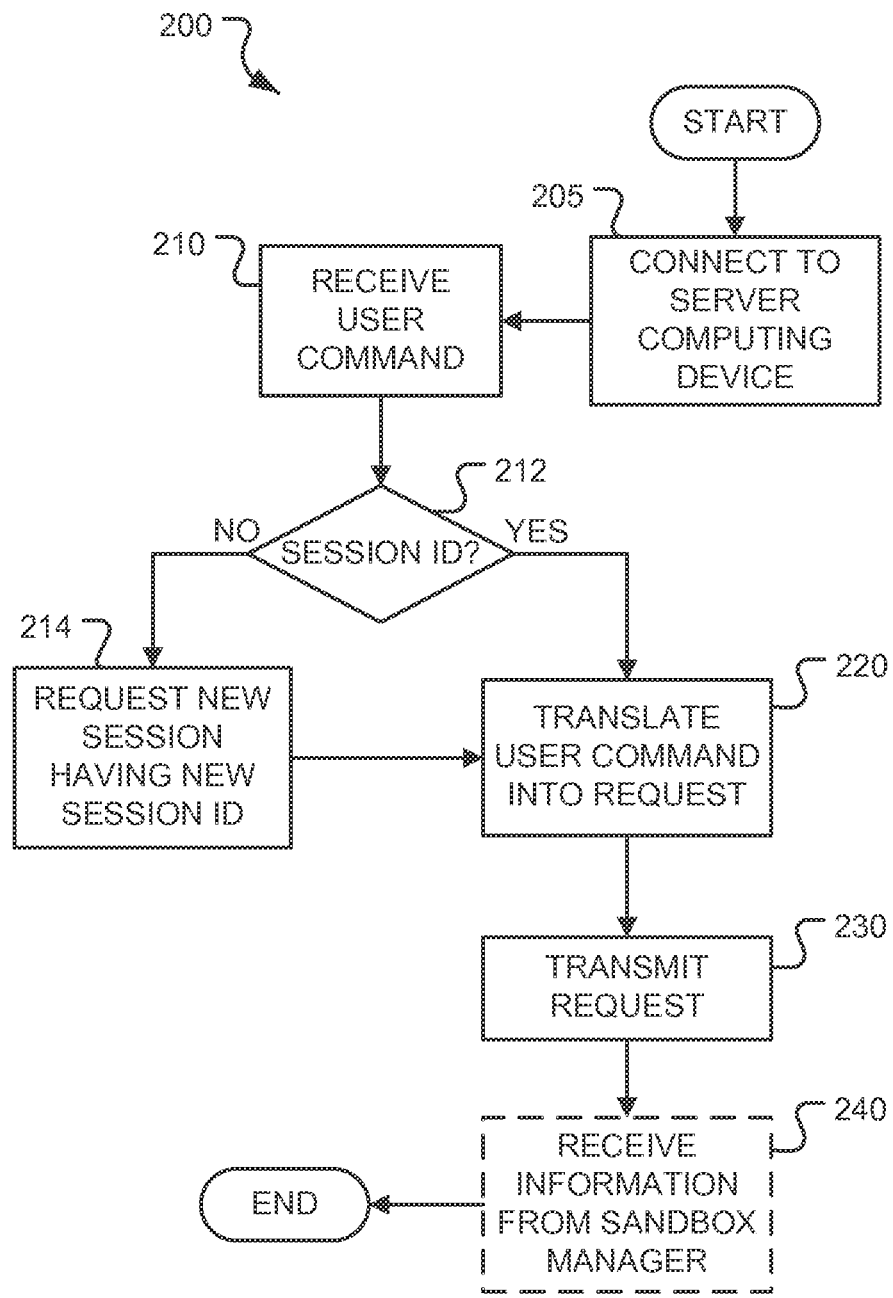
FIG. 4 is a flow diagram of a method performed by the Client Application of FIG. 2.

FIG. 4 provides a flow diagram of a method 200 performed by the Client Application 132 illustrated in FIG. 2. In first block 205, the Client Application 132 connects with the server computing device 7 illustrated in FIG. 1. In embodiments in which the server computing device 7 includes the web server components 142 that implement a website, and the Client Application 132 is a web browser in which the plug-in 136 is installed, in block 205, the Client Application 132 connects to the server computing device 7 over the network 10, and downloads a webpage from the website. The webpage includes a reference to the plug-in 136. When the Client Application 132 receives the reference to the plug-in 136, the Client Application 132 loads the plug-in 136.

In block 210, the Client Application 132 receives a command from the user via a conventional user interface (e.g., a mouse, keyboard, and the like). The user command instructs the Client Application 132 to download the virtualized application file 140 and/or execute the virtualized application file 140.

The plug-in 136 is configured to request a different session for each virtualized application file being transferred and/or executed. Thus, each virtualized application file being transferred and/or executed may be identified by a unique session identifier.

In decision block 212, the plug-in 136 determines whether a session identifier is associated with the virtualized application file 140. The decision in decision block 212 is "YES" when a session identifier is associated with the virtualized application file 140. The decision in decision block 212 is "NO" when a session identifier is not associated with the virtualized application file 140.

When the decision in decision block 212 is "NO," in block 214, the plug-in 136 requests a new communication session having a unique session identifier with the Sandbox Manager 134 over the communication link 138. Then, the Client Application 132 advances to block 220.

When the decision in decision block 212 is "YES," the Client Application 132 advances to block 220.

In block 220, the Client Application 132 translates the user command received in block 210 into a request to be sent to the Sandbox Manager 134 over the communication link 138. For example, in embodiments in which the Client Application 132 is a web browser in which the plug-in 136 is loaded, in block 210, the web browser receives the user command (e.g., the user clicks on a hyperlink, presses a button, and the like) and in block 220, the plug-in 136 translates the user command into a request including a command (e.g., one of the commands listed in Table A above) and optionally, one or more parameters (e.g., the session identifier associated with the virtualized application file 140). The user command may be an instruction to download the virtualized application file 140 (see FIG. 3), an instruction to execute the virtualized application file 140, and the like. As mentioned above, the request may be a string including the command and parameters, if any.

Returning to FIG. 4, in block 230, the Client Application 132 transmits the request to the Sandbox Manager 134 over the communication link 138 (e.g., a TCP connection) illustrated in FIG. 2. Optionally, in block 240, the Client Application 132 may receive information from the Sandbox Manager 134. The information received may be a response to the command (e.g., a response to a "ping" command), a result of performing the command, status and/or progress information related to performing a command, an error message, and the like. Then, the method 200 terminates.

Sandbox Manager

Figure 5:
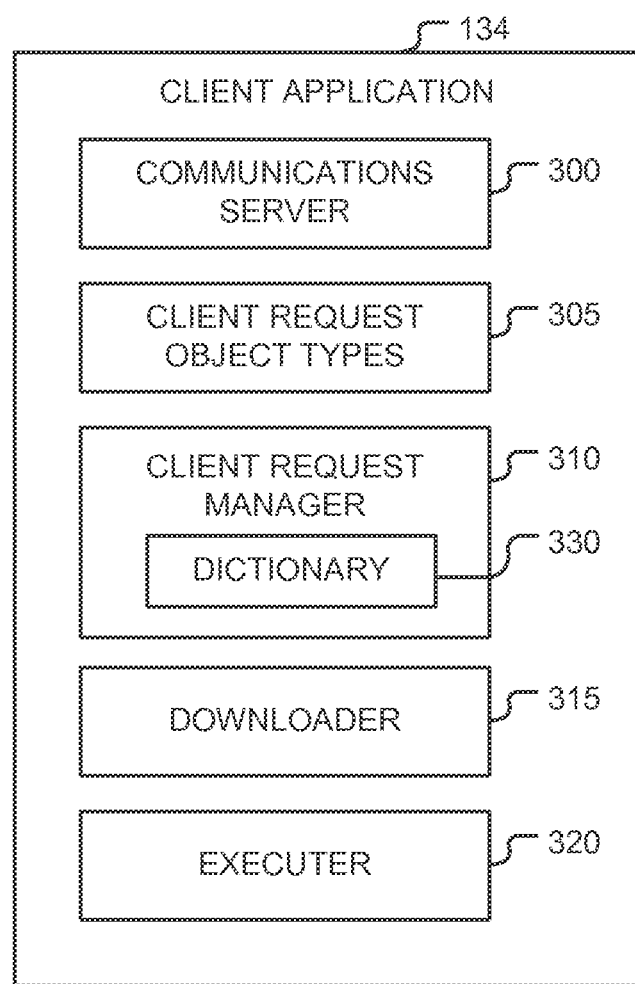
FIG. 5 is a diagram illustrating the components of the Sandbox Manager of FIG. 2.

Returning to FIG. 2, the Sandbox Manager 134 receives requests from the Client Application 132 and performs the command included in the requests. The Sandbox Manager 134 manages the transfer of the virtualized application file 140 (see FIG. 3) from the server computing device 7 to the client computing device 9 illustrated in FIG. 1. The Sandbox Manager 134 also manages execution of the virtual application 110 (see FIG. 3) on the client computing device 9 (see FIG. 1). Turning to FIG. 5, the Sandbox Manager 134 includes a communications server 300 (e.g., a TCP server), one or more predefined Client Request object types 305, a Client Request Manager 310, a Downloader 315, and an Executer 320.

Returning to FIG. 4, as mentioned above, in block 214, the plug-in 136 requests a different communication session having a unique session identifier for each virtualized application file being transferred and/or executed. Referring to FIGS. 2 and 5, in response to each request for a new communication session, the communications server 300 establishes a communication session between the Client Application 132 and the Sandbox Manager 134 and generates a unique session identifier for the new communication session. In this manner, each virtualized application file being transferred and/or executed may be identified by a unique session identifier.

Each of the predefined Client Request object types 305 is associated with a particular type of virtualized application file. For example, the Client Request object types 305 include a Client Request object type associated with the virtualized application file 140. The types are used to create a Client Request object for each virtualized application file to be downloaded and/or executed by the Sandbox Manager 134. An object of the Client Request object type associated with the virtualized application file 140 is responsible for managing transfer and execution of the virtualized application file 140, including determining status, managing the cache 139 (see FIG. 2) stored on the filesystem 126A, etc.

The Client Request Manager 310 determines whether a Client Request object has been created for a particular virtualized application file associated with a session identifier. If a Client Request object has not been created for a virtualized application file, the Client Request Manager 310 (see FIG. 5) identifies which of the predefined Client Request object type is configured to manage details about the virtualized application file, creates a Client Request object of the type identified, and associates the Client Request object with the session identifier associated with the virtualized application file. By way of a non-limiting example, a Client Request object may need to be created when the Sandbox Manager 134 receives a "start" command for the first time to start downloading the virtualized application file 140. The Client Request Manager 310 may include a dictionary 330 configured to store Client Request objects for use in performing commands included in requests. The dictionary 330 may be stored in the cache 139 (see FIG. 2) of the filesystem 126A (see FIG. 2).

Each of the Client Request objects includes a status field indicating a status related to the transfer and/or execution of the virtualized application file. Table B below provides non-limiting examples of status values or codes that may be stored in the status field.

TABLE B

| Status Code | Description |
| --- | --- |
| Not Started | Transfer of virtualized application file is currently being initialized. |
| In Progress | Transfer of virtualized application file is currently in progress. |
| Complete | Transfer of virtualized application file has completed and the virtualized application file is ready to execute. |
| Canceled | Transfer of virtualized application file has been cancelled. Transfer may be canceled by a request from the Client Application 132. Alternatively, transfer of virtualized application file may be canceled by an internal operation of the Sandbox Manager 134. |
| Error | Transfer of virtualized application file has been aborted due to an error. An error code may be sent to the Client Application 132. For example, an error code may be encoded in high-order bits of a message sent in response to the "start" command. Table C below provides a non-limiting exemplary list of error codes. |

The status field may be set to "Canceled" when user exits the web page (e.g., browses to another page, closes the browser window, and the like) on which the link to the virtualized application file being downloaded is displayed. By way of a non-limiting example, when the user exits the web page, a cancel call may be created automatically (e.g., by script code executing in the Client Application 132) and sent to the plug-in 136. In response, the plug-in 136 sends a cancel message including the session identifier (e.g., "cancel;<session id>") to the Sandbox Manager 134 over the communication link 138. If the status value of the status field of the Client Request object including the session identifier in the cancel message is "In Progress," the transfer is cancelled by the Sandbox Manager 134.

By way of a non-limiting example, the status value of the status field may be determine in the following manner. If the transfer of the virtualized application file has not yet started, the current status is "Not Started." If the transfer has started and is in progress, the current status is "In Progress." If the transfer has started, is not in progress, and has completed, the current status is "Complete." If the transfer has started, is not in progress, has not completed, and has been canceled, the current status is "Canceled." If the transfer has started, is not in progress, has not completed, has not been canceled, and has encountered an error, the current status is "Error." Table C below provides a non-limiting example of error codes that may used by the Sandbox Manager 134.

TABLE C

| Error Code | Description |
| --- | --- |
| None | No error occurred. |
| Unknown | An unknown error occurred. |
| Invalid Session Id | Session identifier is not valid. |
| Network | An error occurred during transfer of the virtualized application file. |
| Invalid Source | The source path of the virtualized application file (or one of its dependencies) is not valid (e.g., the path is not in the correct format). |

Each of the Client Request objects includes a progress field indicating an amount (e.g., a percentage from 0% to 100%) of the virtualized application file stored in the cache 139 (see FIG. 2) of the filesystem 126A (see FIG. 2).

Each of the Client Request objects may include a path to the transferred virtualized application file stored on the cache 139 (see FIG. 2) of the filesystem 126A (see FIG. 2).

The Downloader 315 downloads a particular virtualized application file identified by a session identifier.

The Executer 320 executes a particular virtualized application file identified by a session identifier.

Figure 6:
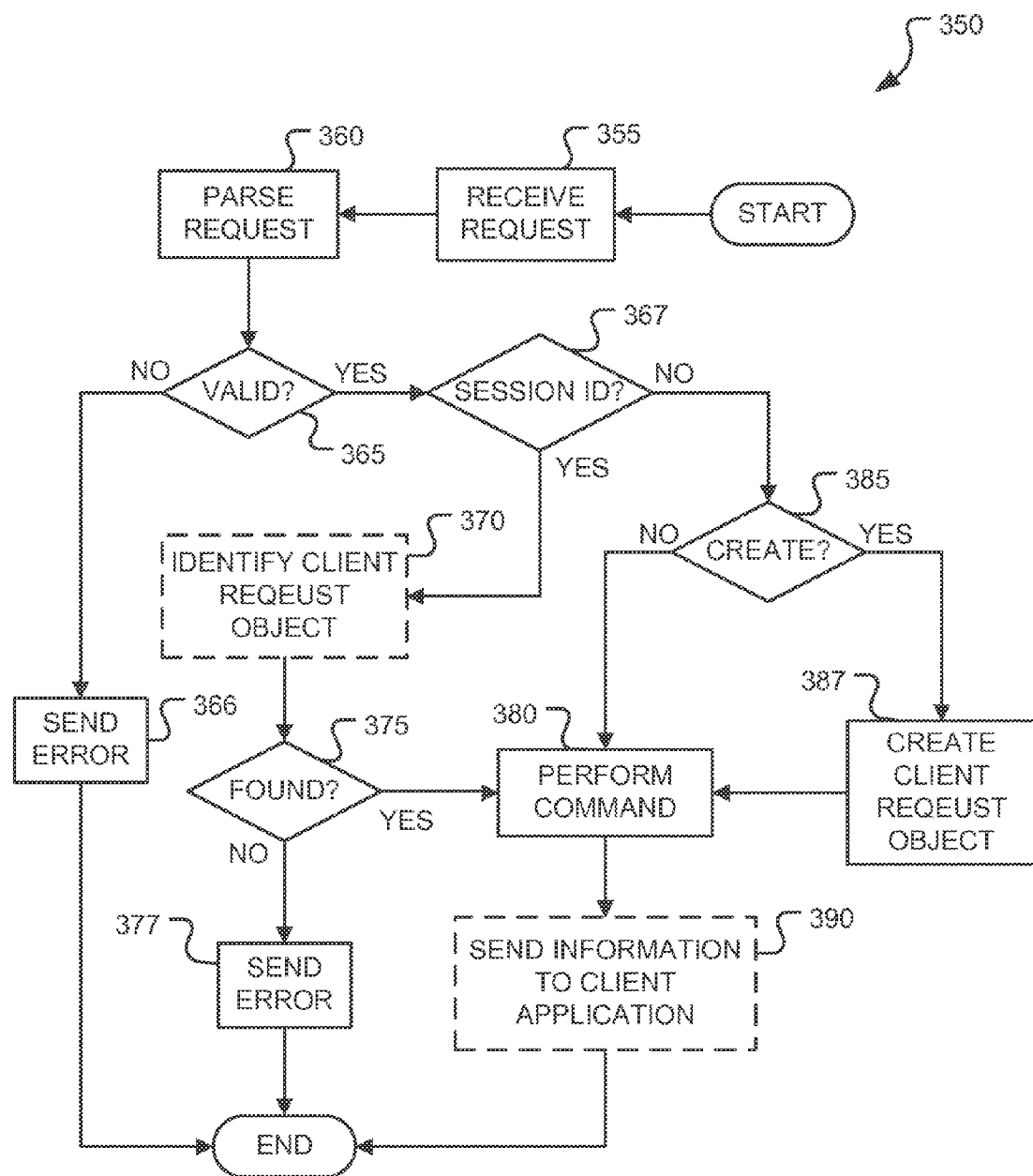
FIG. 6 is a flow diagram of a method performed by the Sandbox Manager of FIG. 2.

FIG. 6 provides a flow diagram of a method 350 performed by the Sandbox Manager 134 illustrated in FIGS. 2 and 5. In first block 355, the Sandbox Manager 134 receives a request from the Client Application 132. After the request is received, in block 360, the Sandbox Manager 134 parses the request to obtain the command and optionally, one or more parameters that may be included in the request. By way of a non-limiting example, in embodiments in which the request is a string, when a request from the Client Application 132 is received at the Sandbox Manager 134, the Sandbox Manager 134 parses the string to obtain the command and optional list of parameters.

Next, in decision block 365, the parameters are validated. By way of a non-limiting example, the parameters may be validated by determining whether the number of parameters matches the number that were expected. The decision in decision block 365 is "YES," when the parameter are valid (e.g., the number of parameters matches the number that were expected). Thus, if a particular command does not include parameters (e.g., the "ping" command), the decision in decision block 365 is "YES," if the request does not include any parameters. The decision in decision block 365 is "NO," when the parameter are invalid (e.g., the number of parameters does not match the number that were expected).

When the decision in decision block 365 is "NO," in block 366, an error message is sent to the Client Application 132. Then, the method 350 terminates.

When the decision in decision block 365 is "YES," the Sandbox Manager 134 advances to decision block 367. In decision block 367, the Sandbox Manager 134 determines whether the request includes a session identifier. The decision in decision block 367 is "YES" when the request includes a session identifier. The decision in decision block 367 is "NO" when the request does not include a session identifier.

When the decision in decision block 367 is "YES," in block 370, the session identifier is used to identify or locate a Client Request object associated with the session identifier and responsible for downloading and/or executing the virtualized application file identified by the session identifier. The dictionary 330 of the Client Request Manager 310 may be used to lookup the Client Request object associated with the session identifier.

In decision block 375, the Sandbox Manager 134 determines whether a Client Request object associated with the session identifier has been identified. The decision in decision block 375 is "YES," when a Client Request object associated with the session identifier has been identified. The decision in decision block 375 is "NO," when a Client Request object associated with the session identifier has not been identified in block 370.

When the decision in decision block 375 is "NO," in block 377, the Sandbox Manager 134 sends an error message to the Client Application 132. The error message may include the error indicator "Invalid Session Id" (see Table C above). Then, the method 350 terminates. Thus, if a command is sent to the Sandbox Manager 134 with a session identifier that is not in the dictionary 330, an error is returned to the Client Application 132 and a new request must be sent to the Sandbox Manager 134. For example, if a "status," "progress," or "exec" command was received in block 355 including a session identifier not associated with a Client Request object, for the Sandbox Manager 134 to perform the command, the transfer must be started again with a new request including the "start" command.

When the decision in decision block 375 is "YES," the Sandbox Manager 134 advances to block 380 described below.

When the decision in decision block 367 is "NO," the Sandbox Manager 134 advances to decision block 385 to determine whether the Sandbox Manager 134 should create a new Client Request object. Referring to Table A above, only two commands listed do not include the session identifier: the "start" command; and the "ping" command. The decision in decision block 385 is "YES" when the command in the request is the "start" command. Otherwise, the decision in decision block 385 is "NO." Thus, the decision in decision block 385 is "NO" when the request includes the "ping" command.

When the decision in decision block 385 is "YES," in block 387, the Sandbox Manager 134 creates a new Client Request object and associates the new Client Request object with a session identifier. By way of a non-limiting example, a method call may be made to the Client Request Manager 310 (see FIG. 5) to create the new Client Request object. In response to the method call, the Client Request Manager 310 identifies the Client Request object type that manages details about the particular virtualized application file being transferred to and/or executed on the client computing device 9 (see FIG. 1). Then, a new Client Request object having the type identified by the Client Request Manager 310 is created.

The Client Request Manager 310 includes a Client Request object for each virtualized application file the Sandbox Manager 134 is transferring and/or executing. The Client Request object may be cached in the dictionary 330 of the Client Request Manager 310, which may be configured to provide fast lookup of the Client Request object in response to subsequent requests including the session identifier involving the cached Client Request object. The Client Request object is responsible for managing the transfer of the virtualized application file, status of the transfer, progress of the transfer, execution of the virtualized application file, management of the cache 139 (see FIG. 2), etc. Thus, when a transfer is started, a unique session identifier is generated, a Client Request object is created, the Client Request object is associated with the unique session identifier, and the Client Request object is stored in the dictionary 330 for future lookups. The status field of the new Client Request object is set to "Not Started" and the progress field is set to "0%."

Then, the Sandbox Manager 134 advances to block 380 from block 387. When the decision in decision block 385 is "NO," the Sandbox Manager 134 also advances to block 380.

In block 380, Sandbox Manager 134 performs the command. If applicable, the command is executed on the Client Request object identified in block 370 or created in block 387. Then, in optional block 390, Sandbox Manager 134 sends information back to the Client Application 132. For example, as discussed below with respect to the method 400 (see FIG. 7), some commands instruct the Sandbox Manager 134 to perform operations that return values to the Client Application 132. Then, the method 350 terminates.

If the command is a "ping" command, in blocks 380 and 390, the Sandbox Manager 134 sends a response to the Client Application 132. If the command is a "start" command, in block 380, the Downloader 315 downloads the virtualized application file 140. If the command is a "status" command, in blocks 380 and 390, the Sandbox Manager 134 obtains the status value from the status field of the Client Request object identified in block 370 or created in block 387 and sends the status value to the Client Application 132. If the command is a "progress" command, in blocks 380 and 390, the Sandbox Manager 134 obtains the progress value from the progress field of the Client Request object identified in block 370 or created in block 387 and sends the progress value to the Client Application 132. If the command is a "exec" command, in block 380, the Executer 320 executes the virtualized application file 140.

Figure 7:
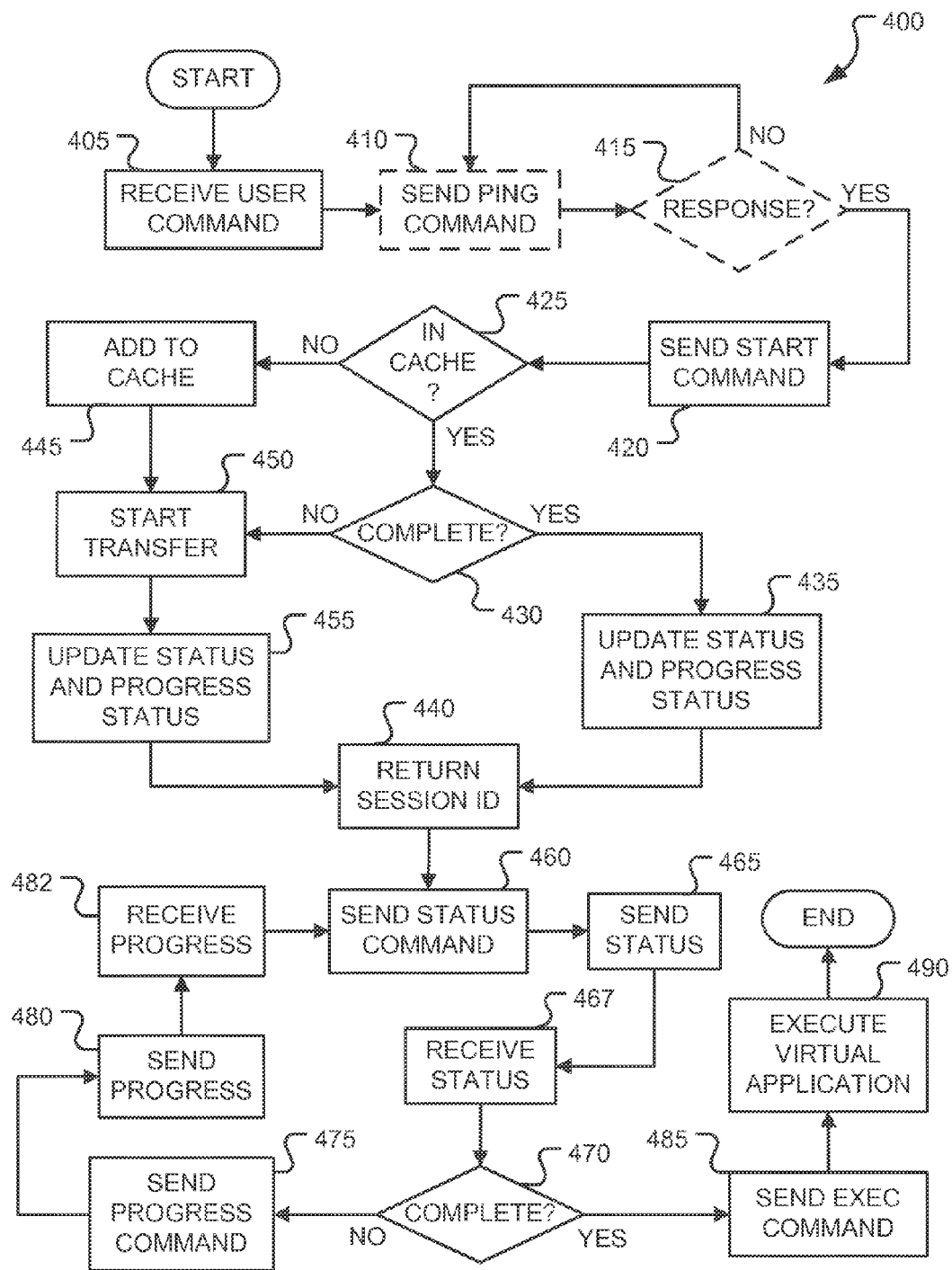
FIG. 7 is a flow diagram of a method of transferring the virtualized application file from the server computing device to the client computing device over a network and/or executing the virtualized application file on the client computing device.

FIG. 7 is a flow diagram illustrating the method 400, which provides a non-limiting example of a typical communication flow between the Client Application 132 and the Sandbox Manager 134. The method 400 transfers the virtualized application file 140 (if the virtualized application file 140 is not already stored in the cache 139 illustrated in FIG. 2) from the server computing device 7 (see FIG. 1) to the cache 139 illustrated in FIG. 2 of the client computing device 9 (see FIG. 1). The method 400 then executes the downloaded virtualized application file 140 stored in the cache 139 on the client computing device 9 (see FIG. 1). The method 400 is performable automatically by the Client Application 132 and the Sandbox Manager 134 after the user has entered a single user command into the Client Application 132. Thus, the method 400 may be characterized as implementing a one-click virtualized application file download manager and Executer.

In first block 405, the Client Application 132 receives a new user command to download and execute the virtualized application file 140. In block 410, the Client Application 132 sends a request including the "ping" command to the Sandbox Manager 134. The "ping" command is sent by the Client Application 132 to determine whether the Sandbox Manager 134 is in a state to service commands (e.g., available and functioning) and capable of responding to requests. If the Sandbox Manager 134 is running and in a state to service commands, the Sandbox Manager 134 will send a response to the Client Application 132.

In decision block 415, the Client Application 132 determines whether it has received a response from the Sandbox Manager 134 to the request sent in block 410. The decision in the decision block 415 is "YES" when the Client Application 132 has received a response from the Sandbox Manager 134 indicating that the Sandbox Manager 134 is in a state to service commands and is capable of responding to requests. The decision in the decision block 415 is "NO" when the Client Application 132 has not received a response from the Sandbox Manager 134 or receives a response indicating the Sandbox Manager 134 is not in a state to service commands (e.g., available and functioning) or is incapable of responding to requests.

When the decision in the decision block 415 is "NO," the Client Application 132 returns to block 410. Alternatively, when the decision in the decision block 415 is "NO," the method 400 may terminate. Optionally, the Client Application 132 may display a message to the user indicating the virtualized application file 140 is not available to download.

When the decision in the decision block 415 is "YES," in block 420, the Client Application 132 establishes a new communication session with the Sandbox Manager 134 and sends a request including a "start" command to the Sandbox Manager 134. As mentioned above, when the communications server 300 (see FIG. 5) of the Sandbox Manager 134 initiates a new session, the communications server 300 generates a new and unique session identifier. The "start" command commands the Sandbox Manager 134 to begin transferring the virtualized application file 140.

In block 425, when the Sandbox Manager 134 receives the "start" command, the Client Request Manager 310 identifies a Client Request object type for the virtualized application file 140, creates a Client Request object of the type identified, and associates the session identifier with the new Client Request object. Then, the Sandbox Manager 134 determines whether at least a portion of the virtualized application file 140 is stored in the cache 139 (see FIG. 2) of the filesystem 126A (see FIG. 2). The decision in the decision block 425 is "YES" when at least a portion of the virtualized application file 140 is stored in the cache 139 (see FIG. 2). Otherwise, the decision in the decision block 425 is "NO."

When the decision in decision block 425 is "YES," in decision block 430, the Sandbox Manager 134 determines whether the virtualized application file 140 is stored in its entirety in the cache 139 (see FIG. 2) of the filesystem 126A (see FIG. 2). The decision in the decision block 430 is "YES" when the virtualized application file 140 is stored in its entirety in the cache 139 (see FIG. 2) of the filesystem 126A (see FIG. 2). The decision in the decision block 430 is "NO" when less than the entire virtualized application file 140 is stored in the cache 139 (see FIG. 2).

When the decision in decision block 430 is "YES," the virtualized application file 140 need not be transferred to the client computing device 9 because the virtualized application file is already stored in the cache 139 (see FIG. 2) of the filesystem 126A (see FIG. 2). In block 435, the Sandbox Manager 134 updates the status field of the Client Request object to "Complete" and the progress field to "100%." Then, the Sandbox Manager 134 advances to block 440.

When the decision in decision block 425 or decision block 430 is "NO," the Sandbox Manager 134 begins transferring the virtualized application file. If the decision block 425 was "NO," in block 445, the Sandbox Manager 134 adds the virtualized application file 140 to the cache 139 (see FIG. 2) of the filesystem 126A (see FIG. 2). The Sandbox Manager 134 sets the status field of the Client Request object to "Not Started" and the progress field to "0%." Then, in block 450, the Sandbox Manager 134 begins transferring the virtualized application file 140 from its beginning.

If the decision block 425 was "YES" but the decision block 430 was "NO," in block 450, the Sandbox Manager 134 sets the status field of the Client Request object to "In Progress," calculates the progress value, and sets the progress field to the calculated progress value. Then, the Sandbox Manager 134 begins transferring the virtualized application file from wherever the previous transfer activities left off. The transfer may be started in a new thread using http protocol. In block 455, the progress field of the Client Request object is updated occasionally (e.g., periodically) to indicate the percentage of the virtualized application file 140 transferred. Then, the Sandbox Manager 134 advances to block 440.

In block 440, the Sandbox Manager 134 returns the session identifier associated with the virtualized application file 140 to the Client Application 132.

In block 460, the Client Application 132 sends a request to the Sandbox Manager 134 including the "status" command. In response to the "status" command, in block 465, the Sandbox Manager 134 sends the status value (e.g., "in progress" or "complete") of the status field of the Client Request object to the Client Application 132. In block 467, the Client Application 132 receives the status value sent by the Sandbox Manager 134. Optionally, the Client Application 132 may display the status value of the transfer to the user.

In decision block 470, the Client Application 132 determines whether the entire virtualized application file has been downloaded. The decision in decision block 470 is "YES," if the status field of the Client Request object indicates the entire virtualized application file has been downloaded (e.g., the status field has the value "Complete"). The decision in decision block 470 is "NO," if the status field of the Client Request object indicates the virtualized application file 140 has not been completely downloaded (e.g., status field has the value "In Progress").

If the decision in decision block 470 is "NO," in block 475, the Client Application 132 sends a request to the Sandbox Manager 134 including the "progress" command to determine the progress value of the transfer of the virtualized application file 140. In response to the "progress" command, in block 480, the Sandbox Manager 134 sends the progress value in the progress field of the Client Request object (e.g., "10%," "25%," etc.) to the Client Application 132. In block 482, the Client Application 132 receives the progress value sent by the Sandbox Manager 134. Optionally, the Client Application 132 may display the progress value to the user. Then, the Client Application 132 returns to block 460.

If the decision in decision block 470 is "YES," in block 485, the Client Application 132 sends a request to the Sandbox Manager 134 including an "exec" command. In response to the "exec" command, in block 490, the Executer 320 (see FIG. 5) of the Sandbox Manager 134 executes the virtual application 110 at least partially implemented by the virtualized application file 140 that the Sandbox Manager 134 has just transferred. Then, the method 400 terminates.

As mentioned above, the parameters of the "exec" command includes the session identifier (identifying the virtualized application file transferred) and optional command-line arguments. The session identifier is used to identify the Client Request Object storing the path to the transferred virtualized application file stored on the cache 139 (see FIG. 2) of the filesystem 126A (see FIG. 2).

The path is then used to execute the transferred virtualized application file. The transferred virtualized application file may be executed via an operating system programming interface function call (e.g., ShellExecute, CreateProcess, and the like).

In block 490, if the virtualized application file 140 is configured to be executed inside a virtualized environment provided a virtual machine executable file (e.g., the virtualized application file 140 is not an executable file having the ".exe" extension), the Sandbox Manager 134 executes the virtual machine executable file and instructs the executing virtual machine to execute the virtualized application file 140. The Sandbox Manager 134 may send a command to the operating system 35A to execute the virtual machine inside an operating system shell process. The command may include the path to the virtualized application file 140 as a parameter that the virtual machine uses to locate and execute the virtualized application file 140.

If more than one virtual machine executable file (e.g., virtual machine executable files 137) are stored in the system memory 22A, the Sandbox Manager 134 identifies which of the virtual machine executable files 137 is configured to execute the virtualized application file 140. As explained above, the virtualized application file 140 may include a version identifier that may be used by the Sandbox Manager 134 to select which of the virtual machine executable files 137 is configured to execute the virtualized application file 140. Each of the virtual machine executable files 137 may also include a version identifier that may be matched to the version identifier of a particular virtualized application file to determine whether the virtual machine executable file is configured to execute the particular virtualized application file.

By way of a non-limiting example, blocks 425, 430, 435, 445, 450, and 455 of the method 400 may be implemented in accordance with the following block of pseudo code.

```
// check filesystem cache
long lTransferStartPoint = 0;
string sPath = BuildCacheLocation(uriAppSource);
if(File.Exists(sPath))
{
    long lFullSize = FindFullSize(uriAppSource);
    long lSizeOnDisk = File.GetSize(sPath);
    if(lSizeOnDisk == lFullSize) {
        // the app is already fully cached,
        // no transfer needed
        SetTransferComplete( );
        return;
    }
    lTransferStartPoint = lSizeOnDisk;
}
// start the transfer
StartDownload(uriAppSource, lTransferStartPoint);
```

By way of a non-limiting example, the function named "StartDownload" used in the above block of pseudo code may be implemented as follows:

```
// a function to transfer the application
function void StartDownload(Uri uriSource, long lStartPoint)
{
    HttpWebRequest oReq = HttpWebRequest.Create(uriSource);
    oReq.AddRange(lStartPoint);
    HttpWebResponse oRes = oReq.GetResponse( );
    Stream oStream = oRes.GetResponseStream( );
    while(true) {
        int iBytes = oStream.Read(aBuffer);
        if(iBytes == 0) return;
        WriteBufferToCacheLocation(aBuffer);
        UpdateCurrentProgress( );
    }
}
```

By way of a non-limiting example, the function named "FindFullSize" used in the first block of pseudo code may be implemented as follows:

```
// a function to return the full size of the
// application to be transferred.
function long FindFullSize(Uri uriAppSource)
{
    string sResponse = DoHttpHeadRequest(uriAppSource);
    long lContentLength = ParseContentLength(sResponse);
    return lContentLength;
}
```

Pre-Fetching Operation

Referring to FIG. 2, during a "pre-fetching operation," the Sandbox Manager 134 automatically begins transferring one or more virtualized application files (e.g., the virtualized application file 140) from the server computing device 7 (see FIG. 1) before the user has instructed the Client Application 132 to download and/or execute the file or files being automatically transferred. Virtualized application files being transferred in this manner are referred to as being "prefetched." A portion of the pre-fetching operation may be performed by the Client Application 132 and a portion of the pre-fetching operation may be performed by the Sandbox Manager 134.

Figure 9:
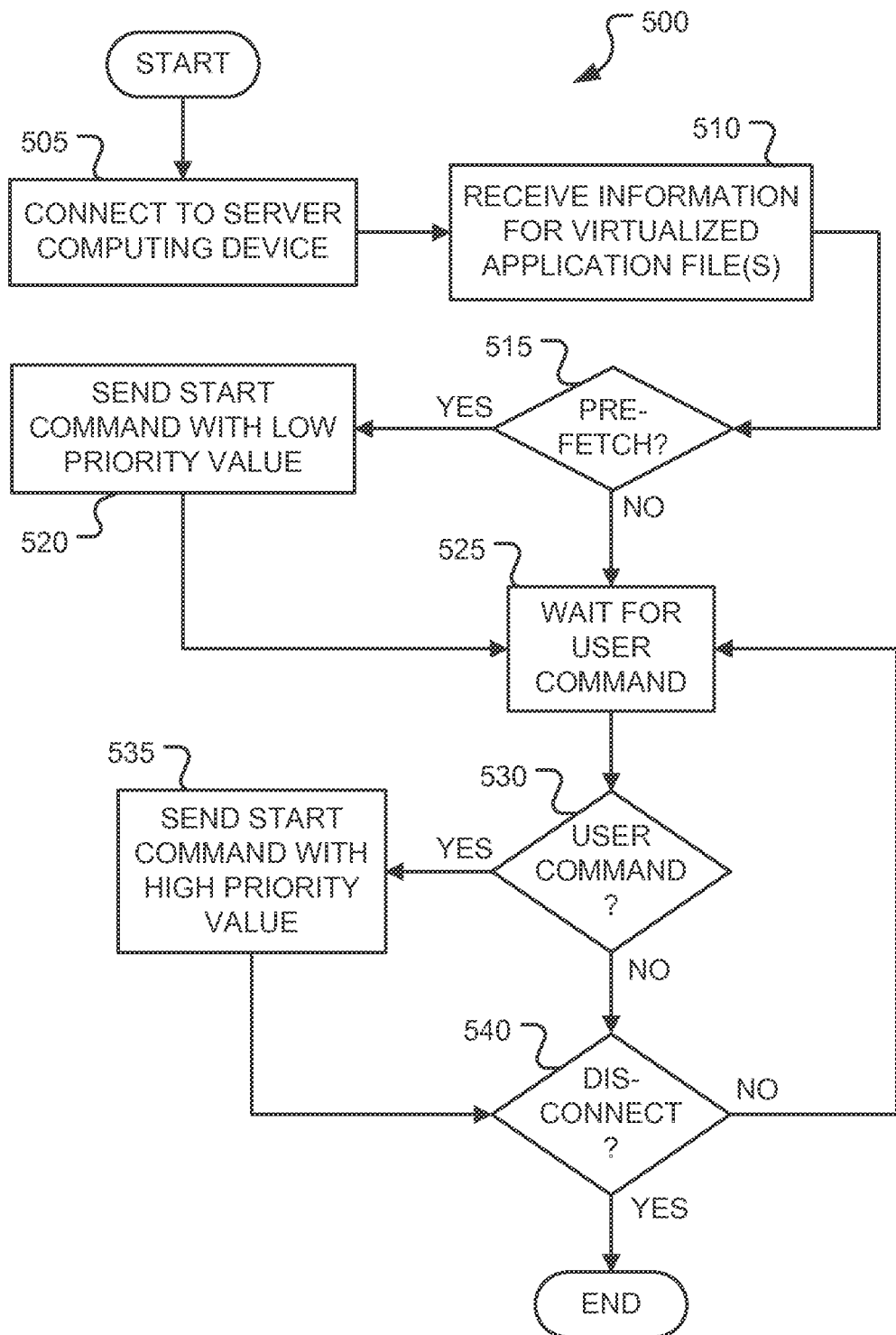
FIG. 9 is a flow diagram of a method implementing a portion of a pre-fetch operation performed by the Client Application of FIG. 2.

FIG. 9 provides a flow diagram of a method 500 that may be performed by the Client Application 132 illustrated in FIG. 2. The method 500 is an exemplary implementation of the portions of the pre-fetching operation performed by the Client Application 132. In first block 505, the Client Application 132 connects to the server computing device 7 (see FIG. 1). The operations performed by the Client Application 132 in block 505 may be substantially similar to the operations performed by the Client Application 132 in block 205 of the method 200 illustrated in FIG. 4.

Referring to FIGS. 1 and 2, in embodiments in which the server computing device 7 includes the web server components 142 that implement a website, and the Client Application 132 is a web browser in which the plug-in 136 is installed, in block 505, the Client Application 132 connects to the server computing device 7 over the network 10, and downloads a webpage from the website.

In block 510, the Client Application 132 receives information from the server computing device 7 (see FIG. 1) with respect to one or more virtualized application files (e.g., the virtualized application file 140). The information received in block 510 includes an application identifier (e.g., a path to the virtualized application file) and a pre-fetch indicator for each virtualized application file available for execution by the client computing device 9. Alternatively, the information may include a single pre-fetch indicator for all virtualized application files available for execution. The application identifier identifies a particular virtualized application file and the pre-fetch indicator indicates whether the pre-fetch operation is to be performed with respect to the particular virtualized application file.

As discussed above, in embodiments in which the client computing device 9 (see FIG. 1) receives a webpage from the server computing device 7 (see FIG. 1), the webpage includes a reference to the plug-in 136. When the Client Application 132 receives the reference to the plug-in 136, the Client Application 132 loads the plug-in 136. The webpage also includes the application identifier and the pre-fetch indicator for each virtualized application file available on the webpage for execution by the client computing device 9. Alternatively, the webpage may include a single pre-fetch indicator for all virtualized application files available for download from the webpage.

In decision block 515, for each virtualized application file available for execution, the Client Application 132 determines whether the pre-fetch indicator associated with the virtualized application file indicates the pre-fetch operation should be performed with respect to the virtualized application file. As explained above, in particular embodiments, the plug-in 136 communicates with the Sandbox Manager 134. Thus, in some embodiments, after the webpage loads, the plug-in 136 determines whether the pre-fetch operation has been enabled for the virtualized application file(s) available for execution on the webpage.

As explained above, the plug-in 136 is configured to request a different session for each virtualized application file being transferred and/or executed. This includes a different session for each virtualized application file being transferred by a pre-fetch operation. Thus, each virtualized application file being transferred and/or executed may be identified by the Client Application 132 and the Sandbox Manager 134 using the unique session identifier. However, for ease of illustration, sending a request for the creation of a session by the Sandbox Manager 134, and receiving of the session identifier from the Sandbox Manager 134 have been omitted from FIG. 9.

For each virtualized application file for which the pre-fetch indicator indicates the pre-fetch operation should be performed, the decision in decision block 515 is "YES," and the Client Application 132 sends a request including the "start" command and two parameters to the Sandbox Manager 134 in block 520. The first parameter is the application identifier (e.g., the session identifier) associated with the virtualized application file to be transferred and the second parameter is the priority value for the transfer. In block 520, the priority value indicates the transfer has a low priority.

In block 520, while the virtualized application file is downloading, the Client Application 132 may send requests including "Status" and "Progress" commands as described above with respect to blocks 460 and 475, respectively, of the method 400 (illustrated in FIG. 7). In response to these requests, the Client Application 132 may receive responses from the Sandbox Manager 134 as described above with respect to blocks 467 and 482 of the method 400 (illustrated in FIG. 7). However, even if the virtualized application file is fully downloaded, the Client Application 132 does not send a request including the "exec" command to the Sandbox Manager 134.

Then, in block 525, the Client Application 132 waits for a user command to download and/or execute a particular virtualized application file (e.g., the virtualized application file 140). By way of an example, the user command may be received in any manner described above with respect to block 405 of the method 400 (see FIG. 7)

For each virtualized application file for which the pre-fetch indicator indicates the pre-fetch operation is not to be performed, the decision in decision block 515 is "NO." When the decision in decision block 515 is "NO," the Client Application 132 does not send a request to the Sandbox Manager 134 and instead waits for a user command in block 525. Pre-fetching may be disabled for many reasons. For example, there may be too many virtualized application files available for download and/or execution. Alternatively, pre-fetching may be disabled when a particular virtualized application file is too large and/or too infrequently downloaded and/or executed.

In decision block 530, the Client Application 132 determines whether it has received a user command to download and/or execute a particular virtualized application file (e.g., the virtualized application file 140). The decision in decision block 530 is "YES" when the Client Application 132 has received a user command. The decision in decision block 530 is "NO" if the Client Application 132 does not receive a user command.

When the decision in decision block 530 is "YES," in block 535, the Client Application 132 sends a request including the "start" command and two parameters to the Sandbox Manager 134. The first parameter is the application identifier (e.g., the session identifier) associated with the virtualized application file to be transferred. The second parameter is the priority value for the transfer. In block 535, the priority value indicates the transfer has a high priority.

In block 535, while the virtualized application file is downloading, the Client Application 132 may send requests including "Status" and "Progress" commands as described above with respect to blocks 460 and 475, respectively, of the method 400 (illustrated in FIG. 7). In response to these requests, the Sandbox Manager 134 may send responses as described above with respect to blocks 465 and 480 of the method 400 (illustrated in FIG. 7).

Then, optionally, after the virtualized application file is fully downloaded, the Client Application 132 may send a request including the "exec" command to the Sandbox Manager 134. Then, the Client Application 132 advances to decision block 540.

When the decision in decision block 530 is "NO," the Client Application 132 advances to decision block 540.

In decision block 540, the Client Application 132 determines whether it has disconnected from the server computing device 7 (see FIG. 1) or in embodiments in which the Client Application 132 is a web browser, the Client Application 132 determines whether it has navigated to a different webpage. The decision in decision block 540 is "YES" when the Client Application 132 determines it has disconnected from the server computing device 7 (see FIG. 1) or navigated to a different webpage. For example, in embodiments in which the server computing device 7 includes the web server components 142 that implement a website, and the Client Application 132 is a web browser in which the plug-in 136 is installed, the decision in decision block 540 is "YES" when the Client Application 132 determines it has exited the webpage (e.g., navigated to a different webpage) even though the Client Application 132 may remain connected to the server computing device 7. The decision in decision block 540 is "NO" when the Client Application 132 determines it has not disconnected from the server computing device 7 or navigated to a different webpage.

When the decision in decision block 540 is "YES," the method 500 terminates. Alternatively, in embodiments in which the Client Application 132 is a web browser and has navigated to a different webpage provided by the server computing device 7, the web server components 142 may provide a different webpage to the Client Application 132 identifying one or more virtualized application files for download. When this occurs, the Client Application 132 returns to block 510 to receive information related to those virtualized application files.

When the decision in decision block 540 is "NO," the Client Application 132 returns to block 525 to wait for a user command.

Figure 10:
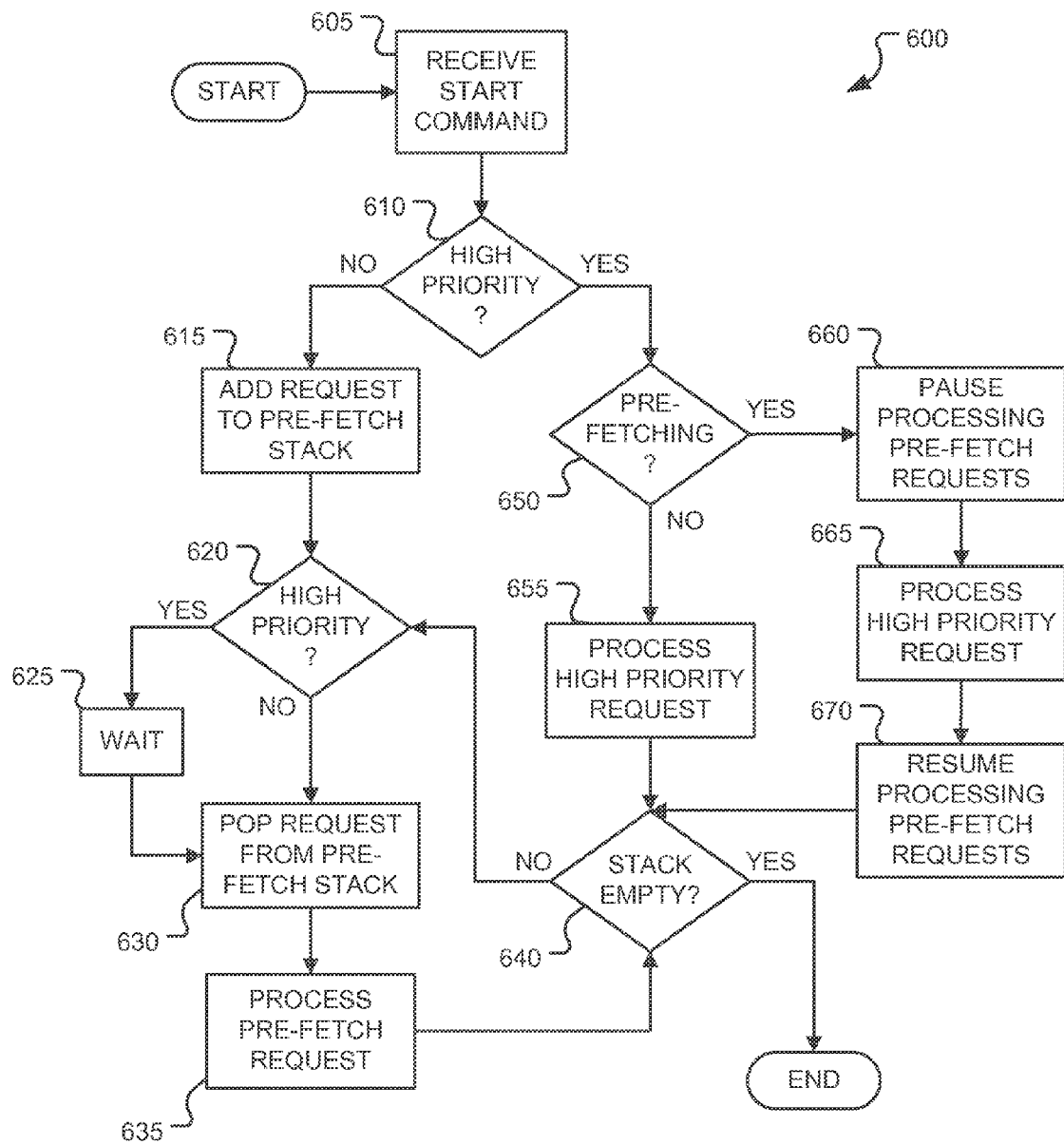
FIG. 10 is a flow diagram of a method implementing a portion of the pre-fetch operation performed by the Sandbox Manager of FIG. 2.

FIG. 10 provides a flow diagram of a method 600 that may be performed by the Sandbox Manager 134 illustrated in FIG. 2. The method 600 is an exemplary implementation of the portions of the pre-fetching operation performed by the Sandbox Manager 134.

As explained above, the Client Application 132 is configured to send a request to the Sandbox Manager 134 requesting a different session for each virtualized application file being transferred and/or executed. This includes a different session for each virtualized application file being transferred by a pre-fetch operation. Thus, each virtualized application file being transferred and/or executed may be identified by the Client Application 132 and the Sandbox Manager 134 using the unique session identifier. However, for ease of illustration, receiving a request for the creation of a session from the Client Application 132, creating the session, and sending the session identifier to the Client Application 132 have been omitted from FIG. 10.

In first block 605, the Sandbox Manager 134 receives a request from the Client Application 132 including the "start" command, the application identifier (e.g., the session identifier), and the priority value. As explained above, a Client Request object is created for each virtualized application file to be downloaded and/or executed. For example, when the Sandbox Manager 134 receives a "start" command for the first time to start downloading the virtualized application file 140, a new Client Request object may be created for the virtualized application file 140. As explained above, the Client Request object associated with the virtualized application file is responsible for managing transfer and execution of the virtualized application file, including determining status, managing the cache 139 (see FIG. 2) stored on the filesystem 126A, etc.

In decision block 610, the Sandbox Manager 134 determines whether the priority value in the request indicates the transfer has a high priority (i.e., the request is for a high priority transfer). The decision in decision block 610 is "YES" when the request is for a high priority transfer. On the other hand, the decision in decision block 610 is "NO" when the priority value in the request indicates the transfer has a low priority (i.e., the request is for a low priority transfer).

When the decision in decision block 610 is "NO," in block 615, the request is added to a pre-fetch stack (or similar data structure). Then, in decision block 620, the Sandbox Manager 134 determines whether a high priority request is presently being processed. The decision in decision block 620 is "YES" when a high priority request is presently being processed. On the other hand, the decision in decision block 620 is "NO" when a high priority request is not presently being processed.

When the decision in decision block 620 is "YES," in block 625, the Sandbox Manager 134 waits to process low priority requests (e.g., low priority requests in the pre-fetch stack) until after the high priority request has finished processing. Then, the Sandbox Manager 134 advances to block 630.

When the decision in decision block 620 is "NO," the Sandbox Manager 134 advances to block 630. In block 630, the Sandbox Manager 134 selects a low priority request for processing. In embodiments in which the requests are stored in a pre-fetch stack, in block 630, the last low priority request added to the pre-fetch stack may be "popped" from the pre-fetch stack.

Then, in block 635, the Sandbox Manager 134 processes the low priority request selected in block 630. In block 635, if no portion of the virtualized application file identified by the application identifier has been downloaded, the Downloader 315 (see FIG. 5) downloads at least a portion of the virtualized application file. For example, the Downloader 315 may download only a predetermined portion (e.g., 5%, 10%, 25%, 30%, 50%, etc.) of the virtualized application file. In particular embodiments, the portion to be downloaded may be between about 5% and about 20%. By way of a non-limiting example, the predetermined portion may have a predetermined size, e.g., 10 MB, 15 MB, etc. By way of another non-limiting example, the portion to be downloaded may be specified by the user (e.g., as a configuration setting). Further, the Sandbox Manager 134 may determine different portion sizes for different types of virtual applications. In other words, one or more properties or characteristics of a virtual application may be used to determine the size of the portion to be downloaded during a pre-fetch operation.

In embodiments configured to download only a portion of the virtualized application file, after the portion has been downloaded, the Downloader 315 (see FIG. 5) stops downloading the virtualized application file.

If the low priority request is a request to download and/or execute a virtualized application file that has already been at least partially downloaded, any portion of the virtualized application file that was not downloaded by the pre-fetch operation may be downloaded by the Downloader 315 (see FIG. 5) in block 635. For example, if less than the predetermined portion is downloaded, the Downloader 315 may download more of the virtualized application file until the Downloader 315 has downloaded the predetermined portion of the virtualized application file.

If the high priority request is a request to download and/or execute a virtualized application file that has already been downloaded by the Downloader 315 (see FIG. 5) (e.g., by a pre-fetch operation), in block 635, the Downloader 315 (see FIG. 5) need not download any portion of the virtualized application file. For example, if the predetermined portion has been downloaded, the Downloader 315 (see FIG. 5) need not download more of the virtualized application file. In embodiments in which the predetermined portion is one hundred percent, the Downloader 315 (see FIG. 5) need not download more of the virtualized application file when the virtualized application file has been fully downloaded and is stored in the in the cache 139 (see FIG. 2) of the filesystem 126A (see FIG. 2).

However, as mentioned above with respect to the method 500 illustrated in FIG. 9, the Client Application 132 (see FIG. 2) does not send a request including the "exec" command to the Sandbox Manager 134 after sending a low priority request in block 520. Therefore, in block 635, the Executer 320 (see FIG. 5) does not execute the virtualized application file after it is partially or fully downloaded.

While downloading the virtualized application file, the Client Application 132 may send requests including "Status" and "Progress" commands as described above with respect to blocks 460 and 475, respectively, of the method 400 (illustrated in FIG. 7). In response to these requests, in block 635, the Sandbox Manager 134 may send responses as described above with respect to blocks 465 and 480 of the method 400 (illustrated in FIG. 7). Further, the Sandbox Manager 134 may update the status and progress fields of the Client Request objects as described above with respect to blocks 435 and 455 of the method 400 (illustrated in FIG. 7).

Next, in decision block 640, the Sandbox Manager 134 determines whether there are any remaining low priority requests to process. In embodiments in which the low priority requests are stored in a pre-fetch stack, in decision block 640, the Sandbox Manager 134 determines whether there are any low priority requests stored in the pre-fetch stack. The decision in decision block 640 is "YES" when the Sandbox Manager 134 determines there are no low priority requests left to be processed (e.g., the pre-fetch stack is empty). On the other hand, the decision in decision block 640 is "NO" when the Sandbox Manager 134 determines there are low priority requests left to be processed (e.g., the pre-fetch stack is not empty).

When the decision in decision block 640 is "YES," the method 600 terminates. When the decision in decision block 640 is "NO," the Sandbox Manager 134 returns to decision block 620.

When the decision in decision block 610 is "YES," in decision block 650, the Sandbox Manager 134 determines whether it is currently pre-fetching one or more virtualized application files. The decision in decision block 650 is "YES" when the Sandbox Manager 134 is currently pre-fetching one or more virtualized application files. Otherwise, the decision in decision block 650 is "NO."

When the decision in decision block 650 is "NO," in block 655, the Sandbox Manager 134 processes the high priority request. In block 655, if no portion of the virtualized application file identified by the application identifier has been downloaded, the Downloader 315 (see FIG. 5) downloads the virtualized application file. Then, optionally, the Sandbox Manager 134 may receive a request including the "exec" command from the Client Application 132 (sent in block 535 of the method 500 illustrated in FIG. 9). In response, in block 655, the Executer 320 (see FIG. 5) executes the virtualized application file.

If the high priority request is a request to download and/or execute a virtualized application file that has already been at least partially pre-fetched, any portion of the virtualized application file that was not downloaded by the pre-fetch operation may be downloaded by the Downloader 315 (see FIG. 5) as a high priority request in block 655. Then, optionally, the Sandbox Manager 134 may receive a request including the "exec" command from the Client Application 132 (sent in block 535 of the method 500 illustrated in FIG. 9). In response, in block 655, the Executer 320 (see FIG. 5) executes the virtualized application file.

If the high priority request is a request to download and/or execute a virtualized application file that has already been fully downloaded by the Downloader 315 (see FIG. 5) (e.g., by a pre-fetch operation), in block 655, the Downloader 315 (see FIG. 5) need not download any portion of the file. Then, optionally, the Sandbox Manager 134 may receive a request including the "exec" command from the Client Application 132 (sent in block 535 of the method 500 illustrated in FIG. 9). In response, in block 655, the Executer 320 (see FIG. 5) executes the virtualized application file.

In block 655, the Executer 320 (see FIG. 5) may execute the virtualized application file in a manner substantially similar to that described above with respect to block 490 of the method 400 illustrated in FIG. 7.

Returning to FIG. 10, when the decision in decision block 650 is "YES," in block 660, the Sandbox Manager 134 pauses any pre-fetching operations that the Sandbox Manager 134 is currently performing. Then, in block 665, the Sandbox Manager 134 processes the high priority request. In block 665, if none of the virtualized application file identified by the application identifier has been downloaded, the Downloader 315 (see FIG. 5) downloads the virtualized application file. Then, optionally, the Sandbox Manager 134 may receive a request including the "exec" command from the Client Application 132 (sent in block 535 of the method 500 illustrated in FIG. 9). In response, in block 655, the Executer 320 (see FIG. 5) executes the virtualized application file.

If the high priority request is a request to download and/or execute a virtualized application file that has already been at least partially pre-fetched, the priority value for the low priority request may be updated in block 665 to high priority. Then, any portion of the virtualized application file not downloaded by the pre-fetch operation may be downloaded by the Downloader 315 (see FIG. 5) as a high priority request in block 665. Then, optionally, the Sandbox Manager 134 may receive a request including the "exec" command from the Client Application 132 (sent in block 535 of the method 500 illustrated in FIG. 9). In response, in block 655, the Executer 320 (see FIG. 5) executes the virtualized application file.

If the high priority request is a request to download and/or execute a virtualized application file that has already been fully downloaded by the Downloader 315 (see FIG. 5) (e.g., by a pre-fetch operation), in block 665, the Downloader 315 (see FIG. 5) need not download any portion of the file. Then, optionally, the Sandbox Manager 134 may receive a request including the "exec" command from the Client Application 132 (sent in block 535 of the method 500 illustrated in FIG. 9). In response, in block 655, the Executer 320 (see FIG. 5) executes the virtualized application file.

In block 665, the Executer 320 (see FIG. 5) may execute the virtualized application file in a manner substantially similar to that described above with respect to block 490 of the method 400 (illustrated in FIG. 7).

After the high priority request has been processed, in block 670, the Sandbox Manager 134 resumes any pre-fetching operations paused in block 660. Then, the Sandbox Manager 134 advances to decision block 640.

While in the description of method 600 provided above the pre-fetch stack has been described as storing requests, in alternative embodiments, the pre-fetch stack may store Client Request objects instead. Further, while the requests have been described as being stored in a stack, other data structures such as a queue, array, linked list, and the like may be used to store the requests or Client Request objects.

When performing the method 600, the Sandbox Manager 134 treats low priority requests (which are automatically initiated the Client Application 132) differently than high priority requests (which are initiated by a user command provided to the Client Application 132). If no high priority requests are being processed by the Sandbox Manager 134, low priority requests are processed. However, if during the processing of low priority requests, a high priority request is received by the Sandbox Manager 134, processing of the low priority requests is paused.

However, during the processing of high and low priority requests, the user may decide to execute a virtual application on the webpage. As explained above, to do so, the user enters a user command (e.g., clicks on a hyperlink, presses a button, etc.) into the Client Application 132. In response, the Client Application 132 sends a request including the "start" command, the application identifier, and the priority value to the Sandbox Manager 134. Under these circumstances, the priority value will have the high priority value. As explained above, when the Sandbox Manager 134 receives the high priority request, the Sandbox Manager 134 will pause any pre-fetching operations the Sandbox Manager 134 was performing when it received the high priority request.

The following pseudo code provides an exemplary implementation of portions of the method 600.

```
// handle an incoming command request
function void HandleRequest(string sCmdMessage)
{
    string sCmd;
    string[ ] aArgs;
    ParseRequest(sCmdMessage, out sCmd, out aArgs);
    if(sCmd == "start") {
        string sSource = aArgs[0];
        int iPriority = aArgs[1];
        StartTransfer(sSource, iPriority);
    }
    else ...
}
// start an application transfer.
function void StartTransfer(string sSource, int iPriority)
{
    if(iPriority == LOW) {
        PushRequestOnPrefetchStack(sSource);
    }
    else if(iPriority == HIGH) {
        StartTransfer(sSource, FULL_DOWNLOAD);
    }
    PrioritizeTransfers( );
}
// pauses/resumes transfers depending on priority.
function void PrioritizeTransfers( )
{
    int iPriority = FindHighestPriorityRequest( );
    if(iPriority == HIGH) {
        PauseLowPriorityTransfers( );
    }
```

```
        else if(iPriority == LOW) {
            StartLowPriorityTransfers( );
        }
    }
    // a function to transfer the application
    function void StartLowPriorityTransfers( )
    {
        // get the next low priority source
        Uri uriNext = PopRequestFromPrefetchStack( );
        // start the transfer of the first 10MB
        StartTransfer(uriNext, 10 * 1024 * 1024);
    }
    // a function to transfer the application
    function void StartTransfer (Uri uriSource, long
lMaxTransfer)
    {
        // transfer application
        HttpWebRequest oReq = HttpWebRequest.Create(uriSource);
        HttpWebResponse oRes = oReq.GetResponse( );
        Stream oStream = oRes.GetResponseStream( );
        long lTotalTransfer = 0;
        while(true) {
            int iBytes = oStream.Read(aBuffer);
            if(iBytes == 0 | | (lMaxTransfer != FULL_DOWNLOAD
&& lTotalTransfer > lMaxTransfer)) break;
            WriteBufferToCacheLocation(aBuffer);
        }
        // re-prioritize existing transfers
        PrioritizeTransfers( );
    }
```

The pseudo code above includes a function named "HandleRequest" that receives a request sent by the Client Application 132 and extracts the command. If the command is a "start" command, the "HandleRequest" function extracts the application identifier ("sSource") and the priority value ("iPriority") from the parameters. Then, the "HandleRequest" function calls a function named "StartTransfer" configured to receive the application identifier ("sSource") and the priority value ("iPriority").

The "StartTransfer" function configured to receive the application identifier ("sSource") and the priority value ("iPriority") pushes the request to the pre-fetch stack if the priority value has a low value. If instead the priority value of the request has a high value, the "StartTransfer" function calls a function named "StartTransfer" configured to receive the application identifier ("sSource") and a download amount ("lMaxTransfer"). The download amount is specified as being the entire virtualized application file (e.g., the constant "FULL_DOWNLOAD" indicates the entire virtualized application file is be downloaded).

Then, the "StartTransfer" function configured to receive the application identifier ("sSource") and the priority value ("iPriority") calls a function named "PrioritizeTransfers."

The "PrioritizeTransfers" function determines the highest priority value of the requests including the "start" command received by the Sandbox Manager 134. If the highest priority value is the high value, the "PrioritizeTransfers" function calls a function named "PauseLowPriorityTransfers" that pauses download operations being performed in response to low priority requests (i.e., requests including the "start" command and having low value priority values). Thus, the "PrioritizeTransfers" function pauses any pre-fetch operations being performed. If on the other hand, the highest priority value is the low value, the "PrioritizeTransfers" function calls a function named "StartLowPriorityTransfers" that starts download operations with respect to low priority requests. Thus, the "PrioritizeTransfers" function initiates pre-fetch operations.

The "StartLowPriorityTransfers" function pops a low priority request from pre-fetch stack. Then, the "StartLowPriorityTransfers" function calls the "StartTransfer" function configured to receive the application identifier ("sSource") and the download amount ("lMaxTransfer"). The "StartLowPriorityTransfers" function passes the popped low priority request as the application identifier and specifies the download amount (e.g., the product of 10*1024*1024).

The "StartTransfer" function configured to receive the application identifier ("sSource") and the download amount ("lMaxTransfer") downloads the portion of the virtualized application file associated with the application identifier from the server computing device 7 and stores the downloaded portion in the cache 139 (see FIG. 2) of the filesystem 126A (see FIG. 2). Then, the "StartTransfer" function configured to receive the application identifier ("sSource") and the download amount ("lMaxTransfer") calls the "PrioritizeTransfers" function.

The methods 500 and 600 may be used with limited bandwidth connections (like those that are commonly used from user's homes or businesses to help reduce the amount of time required to download and/or execute a virtual application, such as the virtual application 110).

Together, the methods 500 and 600 preemptively transfer at least a portion of a particular virtualized application file to reduce an amount of time required to transfer the particular virtualized application file after the user has entered a user command into the Client Application 132 requesting the download and/or execution of the particular virtualized application file. Thus, the methods 500 and 600 gives the user the impression that the download has taken less time.

Because users typically spend at least some time reviewing a web page before selecting a virtual application to execute (e.g., by clicking on a hyperlink), the methods 500 and 600 may be used to pre-fetch one or more virtualized application files while the user reviews the web page and is not otherwise downloading data over the network 10 (see FIG. 1). In other words, referring to FIG. 1, when the connection between the client computing device 9 and the server computing device 7 is idle or otherwise has capacity, the client computing device 9 may pre-fetch all or a portion of one or more virtualized application files. Thus, the methods 500 and 600 may be characterized as simulating a faster connection without requiring or using additional bandwidth.

For example, a user typically spends 30 seconds or more reading information provided on the web page before selecting a virtual application to execute. During this time (e.g., 30 seconds or more), the Sandbox Manager 134 may be transferring the virtualized application file of the virtual application. Therefore, by the time the user instructs the Client Application 132 to execute the virtual application, the virtualized application file may already be fully downloaded.

Figure 8:
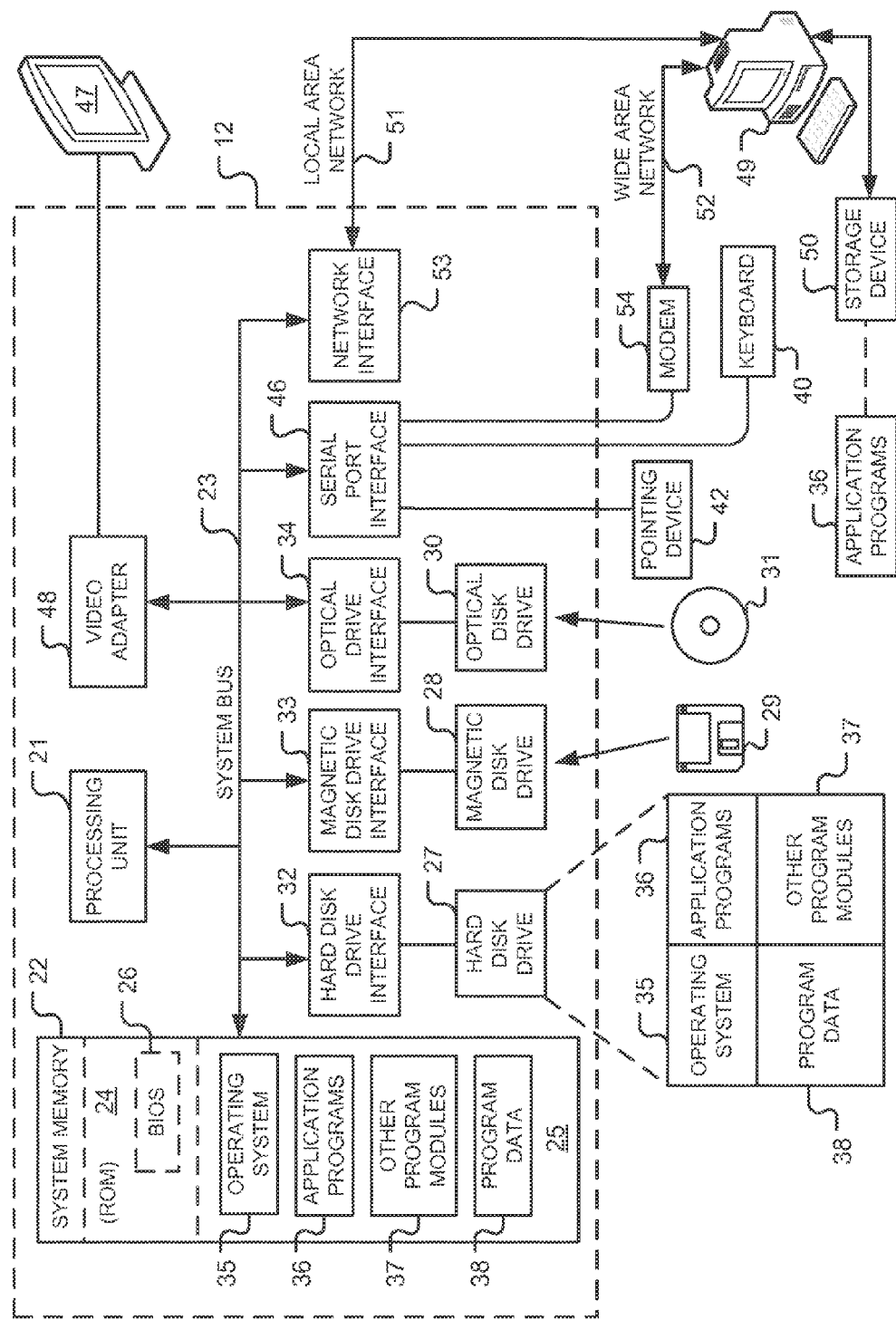
FIG. 8 is a diagram of a hardware environment and an operating environment in which the computing devices of the system of FIG. 1 may be implemented.

FIG. 8 is a diagram of hardware and an operating environment in conjunction with which implementations of the client computing device 9 (including the Client Application 132, the Sandbox Manager 134, the virtual machine executable files 137, and the transferred virtualized application file 140), the server computing device 7 (including the virtualized application file 140, the web server components 142, and the authoring tool 170), and the network 10 may be practiced. The description of FIG. 8 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 8 includes a general-purpose computing device in the form of a computing device 12. Each of the client computing device 9 and the server computing device 7 may be implemented in accordance with the computing device 12. By way of non-limiting example, the Client Application 132, the Sandbox Manager 134, the virtual machine executable files 137, and the transferred virtualized application file 140 may be implemented on a first computing device like the computing device 12. The web server components 142, and the authoring tool 170 may be implemented on a second computing device like the computing device 12 configured to storing the virtualized application file 140 and generate a web page displaying a link (e.g., a hyperlink) to the virtualized application file 140 and providing a reference to the plug-in 136.

The computing device 12 includes the system memory 22. Each of the system memory 22A (see FIG. 2) and the system memory 22B (see FIG. 2) may be constructed in accordance with the system memory 22.

The computing device 12 also includes a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 8 include a local-area network (LAN) 51 and a wide-area network (WAN) 52. Such networking environments are commonplace in offices, enterprise-wide computer networks, intranets and the Internet. The network 10 may include any of the aforementioned networking environments.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

Returning to FIG. 2, the operating system 35A, the Client Application 132, the Sandbox Manager 134, the virtual machine executable files 137, and the transferred virtualized application file 140 may be stored as computer executable components on the system memory 22A. Each of the operating system 35A, the Client Application 132, the Sandbox Manager 134, the virtual machine executable files 137, and the transferred virtualized application file 140 may be implemented using software components that are executable by the processing unit 21 and when executed perform the functions described above.

Returning to FIG. 3, the virtualized application file 140, the web server components 142, and the authoring tool 170 may be stored as computer executable components on the system memory 22B. Each of the virtualized application file 140, the web server components 142, and the authoring tool 170 may be implemented using software components that are executable by the processing unit 21 and when executed perform the functions described above.

Returning to FIG. 9, the method 500 implemented by the Client Application 132 may be stored as computer executable components on the system memory 22A. Returning to FIG. 10, the method 600 implemented by the Sandbox Manager 134 may be stored as computer executable components on the system memory 22A. Each of the methods 500 and 600 may be implemented using software components that are executable by the processing unit 21.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method performed by a virtual process manager and a client application both executing on a first computing device, the method comprising:

the client application connecting to a second computing device over a network, the second computing device storing a virtualized application file at least partially implementing a virtual application, the client application comprising a web browser or an operating system shell process that is implemented by an operating system of the first computing device;

without user input, the client application sending a command to the virtual process manager to download a portion of the virtualized application file from the second computing device;

without user input, the virtual process manager downloading the portion of the virtualized application file from the second computing device, and waiting to execute the virtual application at least partially implemented by the downloaded virtualized application file on the first computing device until the virtual process manager receives a command from the client application to do so;

after the virtual process manager has begun downloading the portion of the virtualized application file from the second computing device, the client application receiving a user command to execute the virtual application at least partially implemented by the virtualized application file and in response to the user command, sending a command to the virtual process manager to execute the virtual application at least partially implemented by the downloaded virtualized application file on the first computing device; and in response to the command to execute the virtual application, the virtual process manager downloading any portions of the virtualized application file not previously downloaded from the second computing device, and executing the virtual application at least partially implemented by the downloaded virtualized application file on the first computing device.

2. The method of claim 1, wherein the client application comprises the web browser, the second computing device transfers a webpage to the client application, the webpage identifying the virtualized application file as being available for download, the webpage being operable to receive the user command to execute the virtual application at least partially implemented by the virtualized application file, and the method further comprises:

the client application receiving the webpage and before receiving the user command to execute the virtual application at least partially implemented by the virtualized application file, the client application sending the command to the virtual process manager to download the portion of the virtualized application file from the second computing device; and after the webpage receives the user command to execute the virtual application at least partially implemented by the virtualized application file, the client application sending the command to the virtual process manager to execute the virtual application at least partially implemented by the downloaded virtualized application file on the first computing device.

3. The method of claim 1, wherein executing the virtual application at least partially implemented by the virtualized application file comprises:

executing a virtual machine executable to implement a virtualized environment; and instructing the virtual machine executable to execute the virtualized application file inside the virtualized environment implemented by the virtual machine executable.

4. The method of claim 1, wherein executing the virtual application at least partially implemented by the virtualized application file comprises:

identifying a version associated with the virtualized application file;

identifying a virtual machine executable configured to execute virtualized application files having the identified version;

executing the identified virtual machine executable to implement a virtualized environment; and instructing the identified virtual machine executable to execute the virtualized application file inside the virtualized environment implemented by the identified virtual machine executable.

5. The method of claim 1, further comprising:

before the virtual process manager begins downloading the virtualized application file from the second computing device and without additional user input, the virtual process manager determining whether the virtualized application file was fully downloaded previously, and if the virtualized application file was fully downloaded previously, the virtual process manager not downloading of the virtualized application file in response to the command to download the virtualized application file from the second computing device from the client application.

6. The method of claim 1, further comprising:

before the virtual process manager begins downloading the virtualized application file and without additional user input, the virtual process manager determining whether the virtualized application file was partially downloaded previously, and if the virtualized application file was partially downloaded previously, the virtual process manager downloading only a portion of the virtualized application file not previously downloaded.

7. The method of claim 1, wherein the portion of the virtualized application file to be downloaded from the second computing device by the virtual process manager in response to the command send by the client application comprises 5% to 20% of the virtualized application file.

8. A non-transitory computer-readable medium comprising:

instructions that when executed by a processor implement a client application comprising a web browser or an operating system shell process that is implemented by an operating system executed by the processor, the client application being configured to:

receive a webpage from a remote server computing device, the webpage identifying a virtualized application file stored on the remote server computing device;

before receiving any user commands with respect to the webpage, send a low priority command to download at least a portion of the virtualized application file from the remote server computing device;

receive a user command with respect to the webpage to execute the virtualized application file, and in response to the user command, send a high priority command to execute the virtualized application file; and instructions that when executed by a processor implement a virtual process manager, the virtual process manager being configured to:

receive the low priority command sent by the client application, in response to receiving the low priority command and without additional user input, begin downloading the portion of the virtualized application file, receive the high priority command sent by the client application, and in response to receiving the high priority command and without additional user input, download any previously undownloaded portions of the virtualized application file, and initiate execution of the downloaded virtualized application file.

9. The computer-readable medium of claim 8, wherein when initiating execution of the downloaded virtualized application file, the virtual process manager is configured to initiate execution of a virtual machine configured to execute the downloaded virtualized application file and instruct the virtual machine to execute the downloaded virtualized application file inside a virtualized environment.

10. A method performed by a first computing device in communication with a second computing device over a network, the method comprising:

at a client application executing on the first computing device, receiving a plurality of application identifiers each associated with a different virtualized application file stored on the second computing device, the client application comprising a web browser or an operating system shell process that is implemented by an operating system of the first computing device;

the client application sending low priority commands to a virtual process manager executing on the first computing device, each of the low priority commands commanding the virtual process manager to download a portion of an associated one of the virtualized application file stored on the second computing device;

at the client application, receiving user commands to execute selected ones of the virtualized application files stored on the second computing device;

in response to each of the user commands, the client application sending a high priority command to the virtual process manager to execute a virtual application at least partially implemented by an associated one of the virtualized application files stored on the second computing device;

at the virtual process manager, receiving the low priority commands sent by the client application;

in response to receiving each of the low priority commands and without additional user input, the virtual process manager initiating download of the associated one of virtualized application files from the second computing device, at the virtual process manager, receiving the high priority commands sent by the client application; and in response to receiving each of the high priority commands sent by the client application and without additional user input, the virtual process manager pausing the downloading initiated in response to the low priority commands, downloading any portion of the associated one of the virtualized application files not downloaded in response to the low priority commands, executing the virtual application at least partially implemented by the downloaded virtualized application file on the first computing device, and resuming the downloading initiated in response to the low priority commands with respect to any of the virtualized application files not associated with one of the high priority commands.

11. The method of claim 10, further comprising:

in response to receiving each of the high priority commands from the client application, before downloading the associated one of the virtualized application files, and without additional user input, the virtual process manager generating a unique file identifier, associating the unique file identifier with the associated one of the virtualized application files, and sending the unique file identifier to the client application, after receiving the unique file identifiers associated with the virtualized application files, the client application sending status inquires to the virtual process manager, each status inquiry comprising one of the unique file identifiers, and after the virtual process manager begins downloading each of the associated ones of virtualized application files in response to receiving the high priority commands from the client application, and without additional user input, the virtual process manager receiving the status inquiries from the client application, and in response to each of the status inquires, determining status information related to the downloading of the virtualized application file associated with the unique file identifier included in the status inquiry, and sending the status information to the client application.

12. The method of claim 11, further comprising:

after receiving each of the user commands to execute selected ones of the virtualized application files, the client application requesting a session with the virtual process manager, and in response to each session request, the virtual process manager initiating a session with the client application and generating a session identifier, wherein the unique file identifiers generated by the virtual process manager are the session identifiers.

13. The method of claim 12, wherein each of the sessions is a Transmission Control Protocol ("TCP") session.

* * * * *